US011494936B2

(12) United States Patent
Ding et al.

(10) Patent No.: US 11,494,936 B2
(45) Date of Patent: Nov. 8, 2022

(54) METHOD AND APPARATUS FOR SELECTING SLIDE MEDIA IMAGE READ LOCATION

(71) Applicant: Ortho-Clinical Diagnostics, Inc., Raritan, NJ (US)

(72) Inventors: Zhong Ding, Pittsford, NY (US); Johanna Julia-Trecaso Miller, Fairport, NY (US); Theodore J. DiMagno, Penfield, NY (US)

(73) Assignee: ORTHO-CLINICAL DIAGNOSTICS, INC., Raritan, NJ (US)

( * ) Notice: Subject to any disclaimer, the term of this patent is extended or adjusted under 35 U.S.C. 154(b) by 90 days.

(21) Appl. No.: 16/455,453

(22) Filed: Jun. 27, 2019

(65) Prior Publication Data

US 2020/0005488 A1 Jan. 2, 2020

Related U.S. Application Data

(60) Provisional application No. 62/849,085, filed on May 16, 2019, provisional application No. 62/693,110, filed on Jul. 2, 2018.

(51) Int. Cl.
*G06T 5/00* (2006.01)
*G06T 7/73* (2017.01)
(52) U.S. Cl.
CPC ............... *G06T 7/74* (2017.01); *G06T 5/001* (2013.01); *G06T 2207/10056* (2013.01)
(58) Field of Classification Search
None
See application file for complete search history.

(56) References Cited

U.S. PATENT DOCUMENTS

2004/0208350 A1\* 10/2004 Rea .......................... G06T 7/12
382/128
2017/0178321 A1\* 6/2017 Nieves Alicea ....... G06V 10/60
2019/0065818 A1\* 2/2019 Lee .......................... G06T 7/12

FOREIGN PATENT DOCUMENTS

WO WO-2017106359 A1 \* 6/2017 ......... G06K 9/00127

OTHER PUBLICATIONS

Kuswandi et al., "Optical sensing systems for microfluidic devices: A review," Analytica Chimica Acta, vol. 601, Issue 2, Oct. 10, 2007, pp. 141-155 (Year: 2007).\*

(Continued)

*Primary Examiner* — Soo Shin
(74) *Attorney, Agent, or Firm* — Dennis A. Majewski; K&L Gates LLP

(57) ABSTRACT

The present disclosure is directed to a method and apparatus for locating a target location on a reaction cell and using the target location to perform an assay. In an example embodiment, a method of performing at least one assay includes obtaining at least one image of a fluid sample located on a reaction cell and creating a set of derivative data including a plurality of derivative data points based on the at least one image. The method also includes determining an image gradient data point for each of the plurality of derivative data points and determining a target location of the fluid sample in the reaction cell based on the image gradient data points. The method further includes performing at least one assay using the target location of the fluid sample in the reaction cell.

27 Claims, 34 Drawing Sheets

(56) References Cited

OTHER PUBLICATIONS

Papkovsky et al., "Biological detection by optical oxygen sensing," Chem Soc Rev. Nov. 21, 2013;42(22):8700-32. doi: 10.1039/c3cs60131e (Year: 2013).*

Richards et al., "Laser speckle contrast analysis (LASCA): a technique for measuring capillary blood flow using the first order statistics of loser speckle patterns," IEE Colloquium on Biomedical Applications of Photonics (Digest No. 1997/124) (Year: 1997).*

Siddharth Sekhar Barpanda ("Use of Image Processing Techniques to Automatically Diagnose Sickle-Cell Anemia present in Red Blood Cells Smear", Department of Electrical Engineering National Institute of Technology Rourkela-769008 (ODISHA), May 2013 (Year: 2013).*

* cited by examiner

| Assay | Level** | PRIOR ART SLIDE | SLIDE (10) |
|---|---|---|---|
| UREA | 7.1 mmol/L | 3.0 | 1.9 |
| | 20.3 mmol/L | 2.3 | 1.7 |
| TRIG | 1.19 mmol/L | 2.0 | 0.7 |
| | 2.69 mmol/L | 1.8 | 0.9 |
| GLU | 4.2 mmol/L | 1.3 | 0.9 |
| | 15.8 mmol/L | 1.3 | 0.9 |
| ALB* | 21 g/L | 2.4 | 1.2 |
| | 45 g/L | 1.8 | 1.1 |
| TBIL | 22 μmol/L | 3.1 | 3.7 |
| | 255 μmol/L | 1.3 | 1.3 |
| ALTV* | 32 U/L | 1.9 | 2.4 |
| | 168 U/L | 1.4 | 1.7 |

| Assay | Level** | PRIOR ART SLIDE | SLIDE (10) |
|---|---|---|---|
| CREA | 77 μmol/L | 2.9 | 1.6 |
| | 470 μmol/L | 1.4 | 1.6 |
| CHOL | 3.7 mmol/L | 1.5 | 1.9 |
| | 6.4 mmol/L | 1.7 | 1.6 |
| Ca | 2.3 mmol/L | 1.9 | 0.9 |
| | 3.0 mmol/L | 1.3 | 0.8 |
| TP* | 36 g/L | 1.1 | 1.0 |
| | 73 g/L | 1.2 | 1.0 |
| ALKP | 106 U/L | 2.7 | 2.2 |
| | 471 U/L | 2.2 | 1.7 |
| AST* | 42 U/L | 1.4 | 1.4 |
| | 200 U/L | 1.4 | 1.2 |

FIG. 22

| Assay | Level** | PRIOR ART SLIDE | SLIDE (10) |
|---|---|---|---|
| UREA | 6.7 mmol/L | 1.7 | 1.9 |
| | 19.1 mmol/L | 1.4 | 1.7 |
| TRIG | 1.4 mmol/L | 1.6 | 0.7 |
| | 2.8 mmol/L | 1.5 | 0.9 |
| GLU | 3.9 mmol/L | 1.3 | 0.9 |
| | 6.3 mmol/L | 1.3 | 0.9 |
| ALB* | 24.4 g/L | 1.6 | 1.2 |
| | 43.8 g/L | 1.7 | 1.1 |
| TBIL | 25.9 µmol/L | 4.4 | 3.7 |
| | 261.4 µmol/L | 2.2 | 1.3 |
| ALTV* | 27.9 U/L | 2.6 | 2.4 |
| | 171.8 U/L | 1.9 | 1.7 |

| Assay | Level** | PRIOR ART SLIDE | SLIDE (10) |
|---|---|---|---|
| CREA | 74.6 µmol/L | 1.9 | 1.6 |
| | 489.6 µmol/L | 1.7 | 1.6 |
| CHOL | 3.9 mmol/L | 1.7 | 1.9 |
| | 6.3 mmol/L | 1.8 | 1.6 |
| Ca | 2.2 mmol/L | 1.4 | 0.9 |
| | 3.0 mmol/L | 1.2 | 1.0 |
| TP* | 38.1 g/L | 1.3 | 1.0 |
| | 67.8 g/L | 1.4 | 1.0 |
| ALKP | 106.9 U/L | 2.22 | 2.25 |
| | 496.1 U/L | 2.1 | 1.7 |
| AST* | 34.0 U/L | 2.0 | 1.4 |
| | 178.3 U/L | 1.8 | 1.2 |

FIG. 24

METHOD AND APPARATUS FOR SELECTING SLIDE MEDIA IMAGE READ LOCATION

PRIORITY CLAIM

The present application claims priority to and the benefit of U.S. Provisional Patent Application No. 62/693,110, filed Jul. 2, 2018, and U.S. Provisional Patent Application No. 62/849,085, filed on May 16, 2019, the entirety of which are incorporated herein by reference.

FIELD OF THE DISCLOSURE

The present disclosure relates generally to a method and apparatus for locating a target location on a reaction cell such as a dry slide or other porous/solid media so that the target location can be used to perform an assay, and more specifically to a method and apparatus for locating, as a target location, a read center of a fluid sample on a solid media.

BACKGROUND

One method of performing an assay is by using an image of a fluid sample that has been dispensed on a solid or porous media. A problem with this method, however, is that the image profile may not be flat, with axis-symmetric gradients radiating from the center of the location where the fluid sample was dispensed. This problem can be caused, for example, by dispensing a sample at an unintended location due to imprecisions in metering, media placement, or variable media. If the area for performing the assay is taken at a pre-determined location, there can be large variations which reduce the accuracy of the assay being performed. Another problem is that there can be imperfections in the reaction image due to optical defects (e.g., dust, coating defects, etc.) or unintended flow patterns that can degrade the assay signal.

SUMMARY

The present disclosure is directed to a method and apparatus for locating a target location in a reaction cell such as a dry slide or other solid media, and using the target location to perform an assay, for example, by obtaining an average optical intensity in a predefined area centered at the target location of the assay signal. In an example embodiment, which may be used with any other embodiment disclosed herein, a method of performing at least one assay includes obtaining at least one image of a fluid sample located on a reaction cell, creating a set of derivative data including a plurality of derivative data points based on the at least one image, determining an image gradient data point for each of the plurality of derivative data points, determining a target location of the fluid sample in the reaction cell based on the image gradient data points, and performing at least one assay using the target location of the fluid sample in the reaction cell.

In another embodiment, which may be used with any other embodiment disclosed herein, the reaction cell is a solid media, a dry slide, or a reaction cuvette.

In another embodiment, which may be used with any other embodiment disclosed herein, the target location is an approximate center of a homogeneous region of the fluid sample in the reaction cell.

In another embodiment, which may be used with any other embodiment disclosed herein, the method includes performing multiple assays using target locations from a plurality of images.

In another embodiment, which may be used with any other embodiment disclosed herein, the derivative data points are first order derivatives based on colors in the at least one image. In an embodiment, the colors in the at least one image represent light intensity.

In another embodiment, which may be used with any other embodiment disclosed herein, determining the target location of the fluid sample includes at least one of: (i) using first image gradient data points having a lower image gradient than second image gradient data points; or (ii) excluding the second image gradient data points having a higher image gradient than the first image gradient data points. In an embodiment, this means that the first order derivatives are taken across the entire image, and then all pixels with the first order derivative higher than a threshold are removed, so that the center of the remaining pixels may be used to find the target location.

In another embodiment, which may be used with any other embodiment disclosed herein, the method includes removing image defects from the at least one image.

In another embodiment, which may be used with any other embodiment disclosed herein, the at least one image is a two-dimensional image.

In another embodiment, which may be used with any other embodiment disclosed herein determining the target location of the fluid sample includes detecting or measuring an indicator reaction of indicator molecules within in the reaction cell formed from at least one reagent combining with the fluid sample.

In another embodiment, which may be used with any other embodiment disclosed herein, the method includes forming a read area around the target location, and wherein performing at least one assay includes using the read area.

In a general example embodiment, which may be used with any other embodiment disclosed herein, a method of performing at least one assay includes obtaining at least one image of a fluid sample located on a reaction cell, creating a set of derivative data including a plurality of derivative data points based on the at least one image, determining a target location of the fluid sample based on the plurality of derivative data points, forming a read area around the target location, and performing at least one assay using the read area.

In another embodiment, which may be used with any other embodiment disclosed herein, the reaction cell is a solid media, a dry slide, or a reaction cuvette.

In another embodiment, which may be used with any other embodiment disclosed herein, the read area appears approximately circular in the at least one image.

In another embodiment, which may be used with any other embodiment disclosed herein, the read area appears approximately elliptical in the at least one image.

In another embodiment, which may be used with any other embodiment disclosed herein, the method includes determining an image gradient data point for each of the plurality of derivative data points, and determining the target location of the fluid sample based on the image gradient data points.

In another embodiment, which may be used with any other embodiment disclosed herein, the method includes performing multiple assays using target locations from a plurality of images.

In another embodiment, which may be used with any other embodiment disclosed herein, the at least one image is a two-dimensional image.

In another general example embodiment, which may be used with any other embodiment disclosed herein, an apparatus for performing at least one assay includes a slide reception location configured to receive at least one reaction cell having a fluid sample located thereon, an imaging device positioned and arranged relative to the slide reception location to obtain at least one image of the fluid sample located in the reaction cell, and a control unit configured to: (i) determine a target location within the fluid sample located in the reaction cell by analyzing derivative data points derived from the at least one image; and (ii) perform at least one assay based on the target location.

In another embodiment, which may be used with any other embodiment disclosed herein, the reaction cell is a solid media, a dry slide, or a reaction cuvette.

In another embodiment, which may be used with any other embodiment disclosed herein, the solid media includes a second reaction cell.

In another embodiment, which may be used with any other embodiment disclosed herein, the target location is an approximately central location of a homogeneous region of the fluid sample.

In another embodiment, which may be used with any other embodiment disclosed herein, the control unit is configured to determine the target location by analyzing an image gradient data point for each of the plurality of derivative data points.

In another embodiment, which may be used with any other embodiment disclosed herein, the control unit is configured to determine the target location by at least one of: (i) using first image gradient data points having a lower image gradient than second image gradient data points; or (ii) excluding the second image gradient data points having a higher image gradient than the first image gradient data points. In an embodiment, this means that the first order derivatives are taken across the entire image, and then all pixels with the first order derivative higher than a threshold are removed, so that the center of the remaining pixels may be used to find the target location.

In another embodiment, which may be used with any other embodiment disclosed herein, the control unit is configured to determine the target location at an approximate geometrical center of first image gradient data points having a lower image gradient than second image gradient data points.

In another embodiment, which may be used with any other embodiment disclosed herein, the control unit is configured to perform multiple different assays using target locations from a plurality of images.

In another embodiment, which may be used with any other embodiment disclosed herein, the target location of the fluid sample in the reaction cell corresponds to a location where an indicator reaction occurs such that an indicator is developed for display as target molecules in the fluid sample react with reagents in the reaction cell.

In another embodiment, which may be used with any other embodiment disclosed herein, any of the structure and functionality disclosed in connection with FIGS. 1 to 37 may be combined with any other structure and functionality disclosed in connection with FIGS. 1 to 37.

In light of the present disclosure and the above aspects, it is therefore an advantage of the present disclosure to provide an improved method and apparatus for locating a target location in a reaction cell of a dry slide, reaction cuvette, or other solid media.

The advantages discussed herein may be found in one, or some, and perhaps not all of the embodiments disclosed herein. Additional features and advantages are described herein, and will be apparent from, the following Detailed Description and the figures.

BRIEF DESCRIPTION OF THE DRAWINGS

Embodiments of the present disclosure will now be explained in further detail by way of example only with reference to the accompanying figures, in which:

FIGS. 22 to 37 illustrate diagrams of test result data comparing analytic performance of the example solid media of FIGS. 1 to 21 to known solid media, according to example embodiments of the present disclosure.

DETAILED DESCRIPTION

The present disclosure is directed to a method and apparatus for locating a target location on a reaction cell, and using the target location to perform an assay. As discussed in more detail below, the presently disclosed method and apparatus are advantageous, for example, in improving computation time, reducing sensitivity to off-center metering, avoiding an edge/frame to minimize the effects of a non-assay signal, and detecting and removing image imperfections (e.g., dust, coating defects, wicking, etc.) to reduce bias or outliers. The image defects may also include foreign particles, bubbles, scratches, etc. The present disclosure describes the reaction cell as a dry slide, reaction curvette, or solid media, but those of ordinary skill in the art will recognize that the present disclosure can be used for other types of reaction cells, for example, porous media such as nitrocellulose, semi-porous and solid media such as an Ouchterlony plate, liquid reagent devices such as a cuvette, flow cell or reaction tube, and/or a solid media chip with an embedded lateral flow array that has an optical measurement zone.

Figure 1:
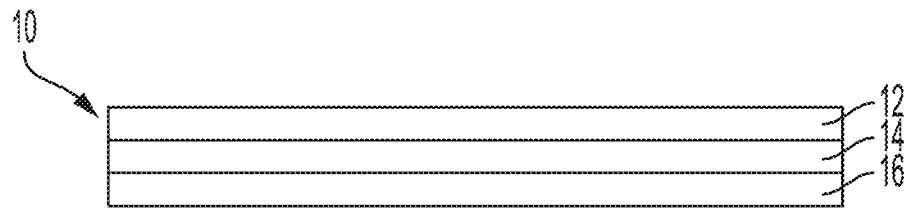
FIG. 1 illustrates a diagram of a side view of an example embodiment of a solid media according to the present disclosure.
Figure 2:
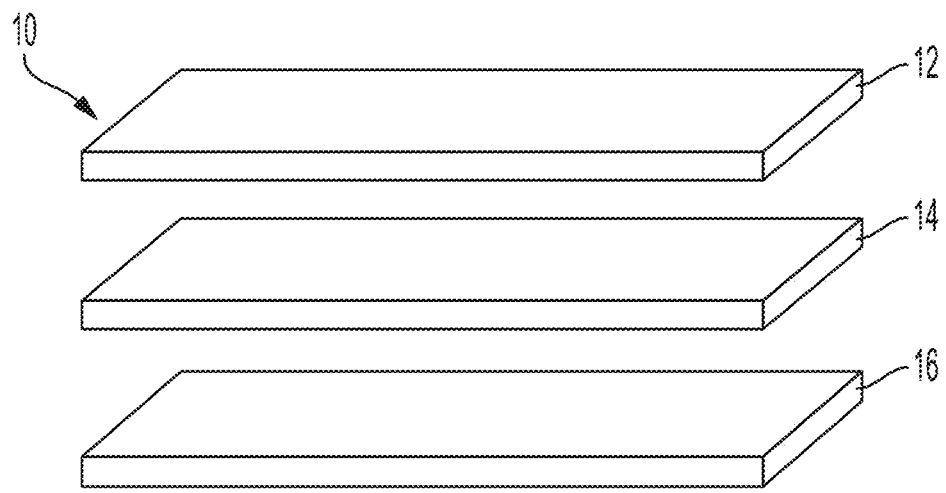
FIG. 2 illustrates a diagram of an exploded perspective view of the solid media of FIG. 1.

FIGS. 1 and 2 illustrate an example embodiment of a reaction cell that may be used in accordance with the present disclosure. In FIGS. 1 and 2, the reaction cell is a solid media 10 that may be used with an assay system 20, according to the present disclosure. Solid Media 10 may be, for example, a single or multi-layer thin-film element on which a fluid sample may be dispensed. In the illustrated embodiment, solid media 10 includes a plurality of layers, including a first layer 12 which may be an upper slide mount layer configured to provide a top base layer with an aperture therethrough to receive a fluid sample. The first layer may also be configured to spread the fluid sample thereacross. The solid media 10 also includes a second layer 14, which may be a reagent layer including a reagent configured to react with the fluid sample for a particular assay. The second layer 14 may also include a support layer to provide support or rigidity for the reagent layer. The solid media further includes a third layer 16, which may be a filter layer that provides a low wavelength cutoff filter to be used for an optical analysis. The third layer 16 may include a lower slide mount layer configured to provide a bottom base layer with an aperture therethrough for an optical analysis.

Figure 3:
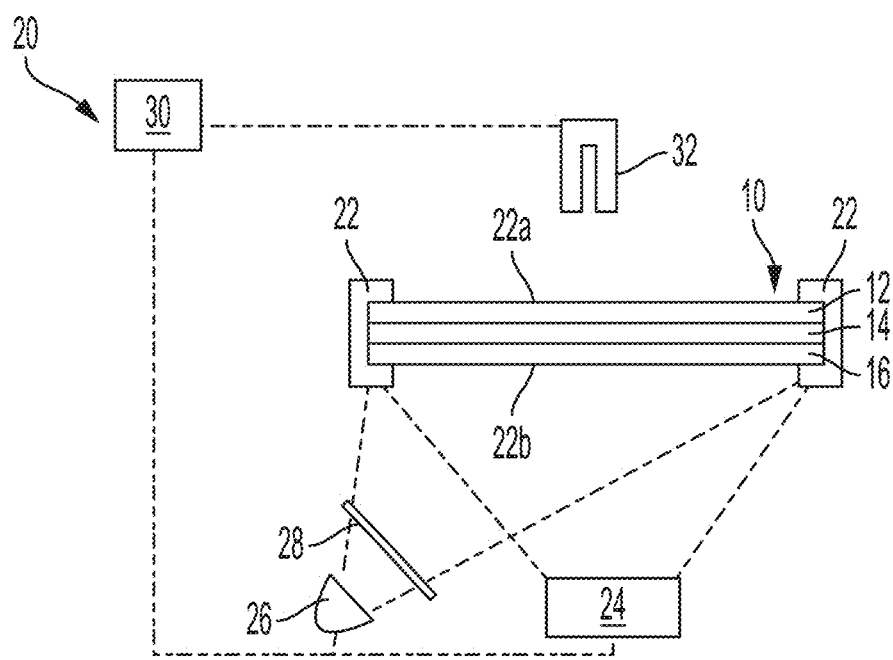
FIG. 3 illustrates a diagram of an example embodiment of an assay device holding the solid media of FIG. 1 according to the present disclosure.

FIG. 3 illustrates an example embodiment of an assay system 20 configured to locate a target location in an image of a fluid sample on solid media 10, and use the target location to perform one or more assay. As illustrated, the assay system 20 may include a slide reception location 22 configured to receive at least one solid media 10, a sample dispensing mechanism 32 configured to dispense a sample fluid onto solid media 10, an imaging device 24 positioned and arranged relative to the solid media reception location 22 to obtain at least one image of the fluid sample located on solid media 10, a light source 26 (e.g., one or more light-emitting diode lights) configured to project light onto solid media 10 so that the light may be modulated by the liquid sample dispensed onto solid media 10, and optionally an optical filter 28 configured to modulate the light from light source 26 to a particular wavelength specific to an assay being performed.

In the illustrated embodiment, the slide reception location 22 is configured to receive and hold the solid media 10 while a fluid sample is added to the solid media 10 and/or while the solid media 10 is illuminated by the light source 26 and imaged by the imaging device 24. In the illustrated embodiment, the slide reception location 22 includes at least one bracket creating a first opening 22a and second opening 22b. The fluid sample may be added to the solid media 10 (e.g., through the aperture in first layer 12) at first opening 22a of the slide reception location 22, while the second opening 22b of the slide reception location 22 enables the solid media 10 to be illuminated and imaged (e.g., through the aperture in third layer 16) after the fluid sample has reacted with the reagent. It should further be understood that the addition of the fluid sample may occur before solid media 10 is received by slide reception location 22, and that the illumination and imaging of the solid media 10 can occur at the first opening 22a at the top of the slide reception location 22 as opposed to the second opening 22b at the bottom of the slide reception location 22.

The assay system 20 of FIG. 2 may further include a control unit 30 configured to control one or more of the elements of assay system 20, determine a target location of the fluid sample on the solid media 10, and analyze the fluid sample on the solid media 10 in accordance with the method(s) described herein. The control unit 30 may include a processor and a non-transitory memory storing instructions for performing the method described herein, wherein the processor executes the instructions to control one or more elements of the assay system 20 to perform one or more assay.

Figure 4:
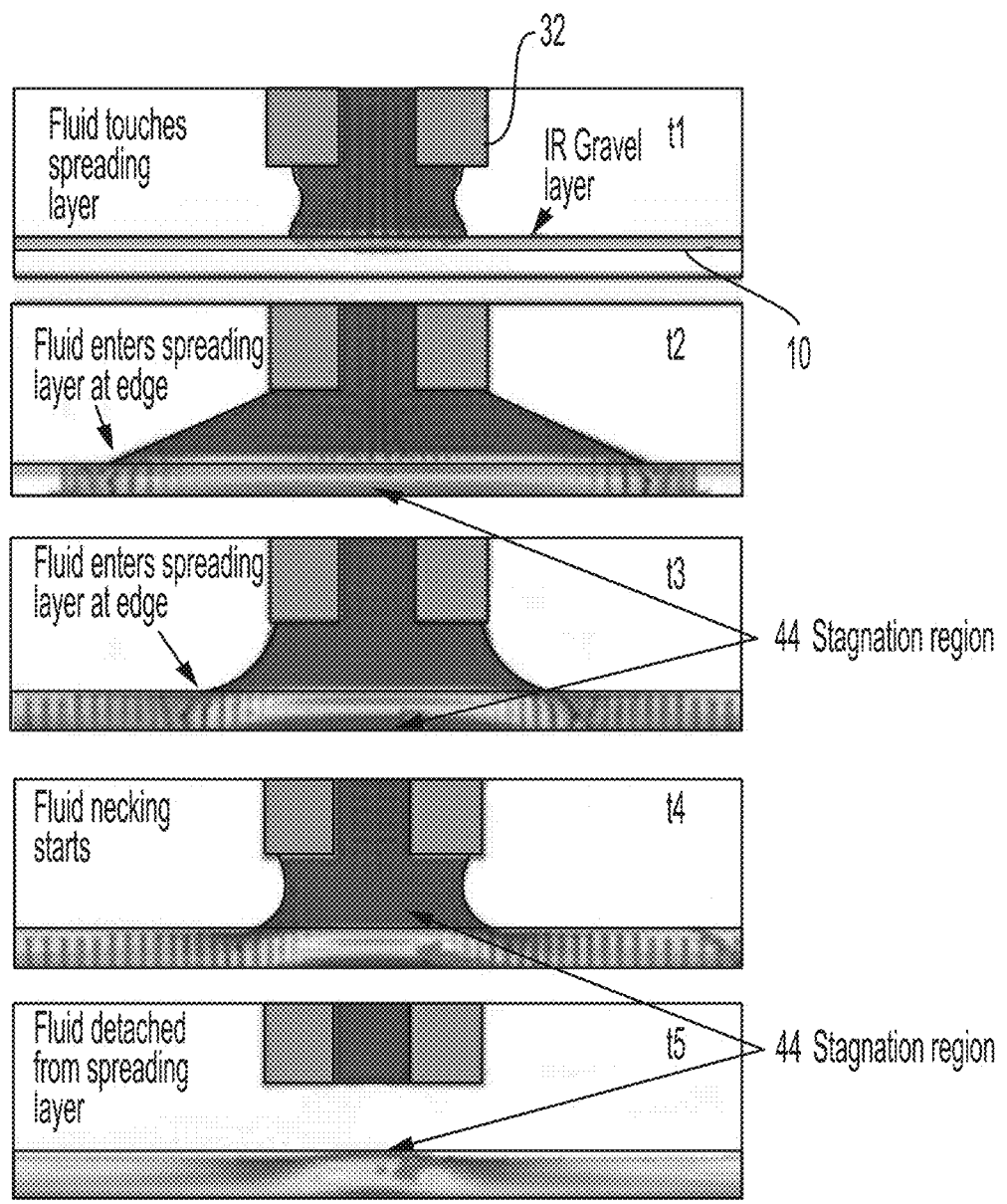
FIG. 4 illustrates a diagram of an example embodiment of a sample dispensing mechanism dispensing a fluid sample onto a solid media according to the present disclosure.

FIG. 4 illustrates a fluid sample being dispensed on solid media 10 by a sample dispensing mechanism 32, according to an example embodiment of the present disclosure. In an embodiment, the fluid sample may be dispensed on the solid media 10 via the sample dispensing mechanism 32 being manually controlled by a user prior to the solid media 10 being inserted into the slide reception location 22 of the assay system 20. The sample dispensing mechanism 32 may be, for example, a pipette or other fluid dispensing mechanism known in the art. Alternatively, the assay system 20 may include the sample dispensing mechanism 32, as illustrated in FIG. 3. Here, the sample dispensing mechanism 32 may be controlled by the user or the control unit 30 to dispense the fluid sample onto (or into) the solid media 10 before or after the solid media 10 is inserted into the slide reception location 22 of the assay system 20.

FIG. 4 illustrates the sample dispensing mechanism 32 dispensing a fluid sample onto the solid media 10 over times $t_1$ to $t_5$. During this time, stagnation and lateral flow create a spatial gradient due to the coated material concentration in the solid media 10. As illustrated, at time $t_1$, the fluid sample is ejected from the sample dispensing mechanism 32 onto the solid media 10 and makes initial contact with the solid media 10. At time $t_2$, the fluid sample continues to be ejected from the sample dispensing mechanism 32 onto the solid media 10, which begins the formation of a stagnation region 44. At time $t_3$, the fluid sample continues to be ejected from the sample dispensing mechanism 32 onto the solid media 10 and spreads across the solid media 10, which increases a size of the stagnation region 44. At time $t_4$, the sample dispensing mechanism 32 begins halting ejection of the fluid sample, which causes fluid necking between the sample dispensing mechanism 32 and the solid media 10, thereby focusing the stagnation region 44 just below the sample dispensing mechanism 32. At time $t_5$, the sample dispensing mechanism 32 is no longer ejecting the fluid sample, leaving behind the stagnation region 44. In the illustrated embodiment, the stagnation region 44 corresponds to the region of least variation. In some embodiments, the stagnation region 44 has relatively low optical density variability and/or a relatively large presence of indicator (e.g., sample dye).

Figure 5:
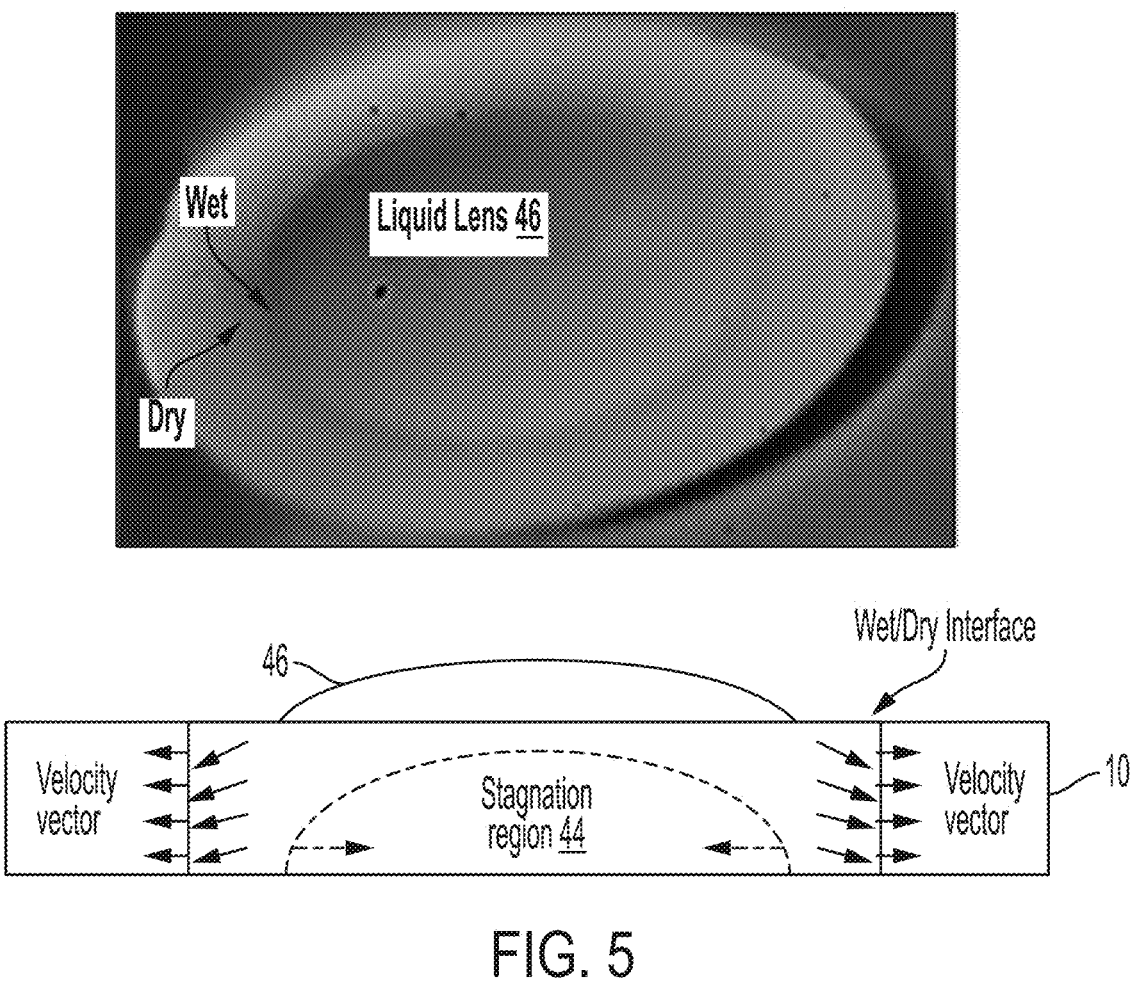
FIG. 5 illustrates a diagram of an example embodiment of a liquid lens formed by a fluid sample on a solid media due to the dispensing shown in FIG. 4.

FIG. 5 illustrates a liquid lens 46 formed by the fluid sample on the solid media 10 due to the stagnation region 44 created by the dispensing process of FIG. 4. As illustrated, the fluid sample forms a circular liquid lens 46 above the solid media 10. As shown in FIG. 5, the circular liquid lens 46 is formed due to an axis-symmetric fluid flow from the sample dispensing mechanism 32, which leads to an axis-symmetric distribution onto the coated material of the solid media 10.

Figure 6:
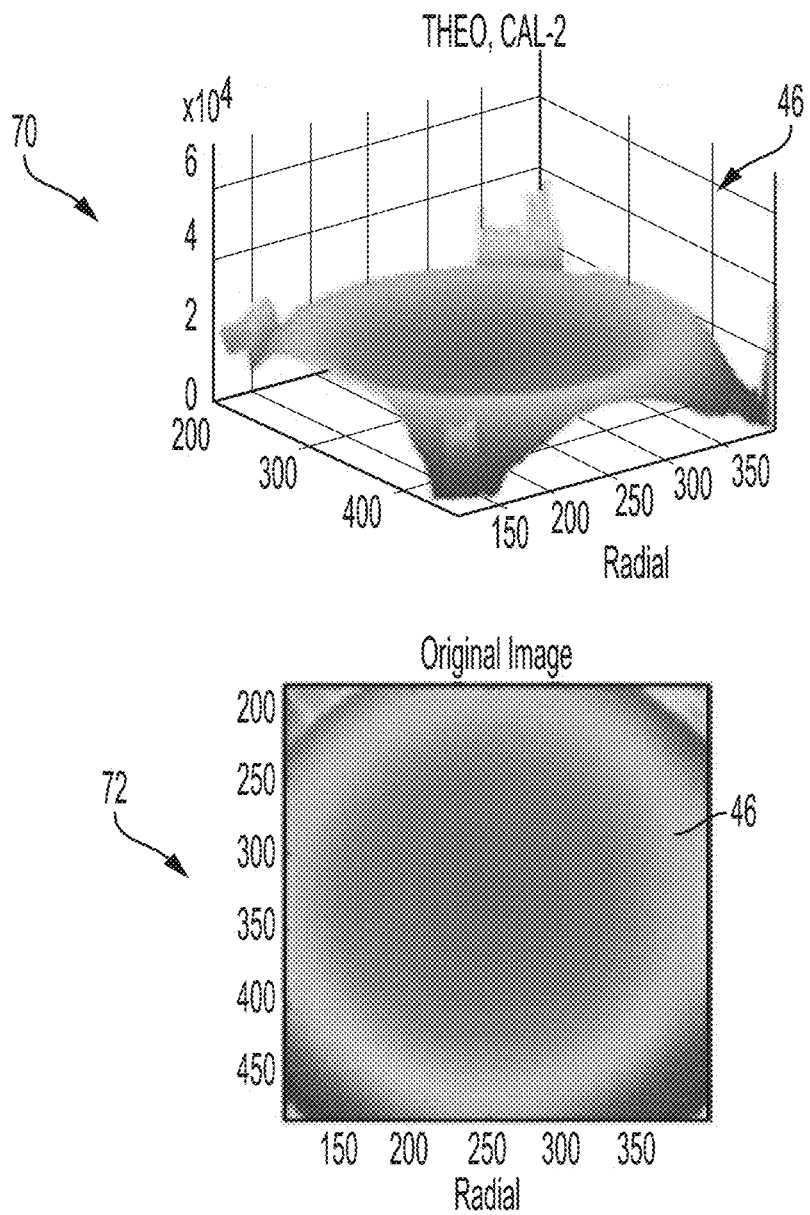
FIG. 6 illustrates a diagram of an example embodiment of top perspective and bottom views showing an example embodiment of the distribution illustrated in FIG. 5.

FIG. 6 illustrates a top perspective view and a bottom view showing an example embodiment of a distribution of the liquid lens 46 over the stagnation region 44. The lower plot of FIG. 6 shows light intensity in a 2-dimensional space (i.e., x and y space) across all pixels in an image. The center of the liquid lens 46 has a lower light intensity while edges of the liquid lens 46 have a higher light intensity. Graph 70 of FIG. 6 has the same information as graph 72, but is presented in 3-dimensional form with a z-axis to represent the light intensity, with the x and y axes representing pixel locations. If a pixel (at an x and y coordinate) has higher light intensity, it has larger z-value in the graphs 70 and 72. Light intensity is measured by a value called 'AD count' ("ADC"). A brighter pixel has a larger AD count value than that of a darker pixel.

Figure 7A:
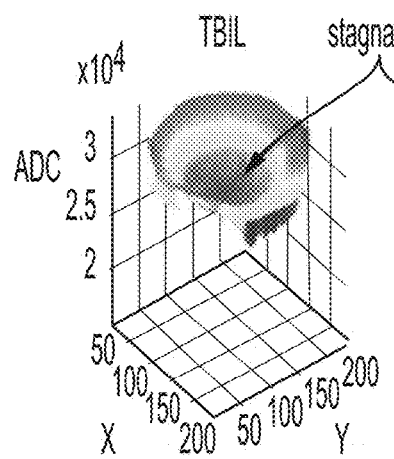
FIGS. 7A to 7C illustrate diagrams of three example patterns that may be formed by a fluid sample on a solid media.
Figure 7B:
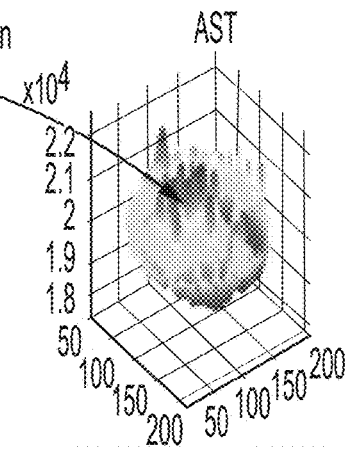
Figure 7C:
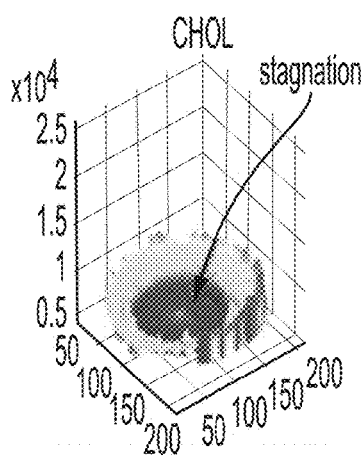

Due to differences in assay kinetics and the uniformity of the coated material of the solid media 10, there are different patterns that can be formed in images taken of the fluid sample on the solid media 10. FIGS. 7A to 7C illustrate three example patterns that may be formed. FIG. 7A shows a concave pattern, FIG. 7B shows a convex pattern, and FIG. 7C shows a complex pattern. All three patterns in FIGS. 7A to 7C share the common feature of a stagnation region 44 at the center and Z axis-symmetric radiation, disturbed by local non-uniformity. The present disclosure uses that common feature to locate the center of the homogeneous region (e.g., relatively homogeneous light intensity) of the fluid sample on the solid media as a target location for use in performing one or more assay.

Figure 8:
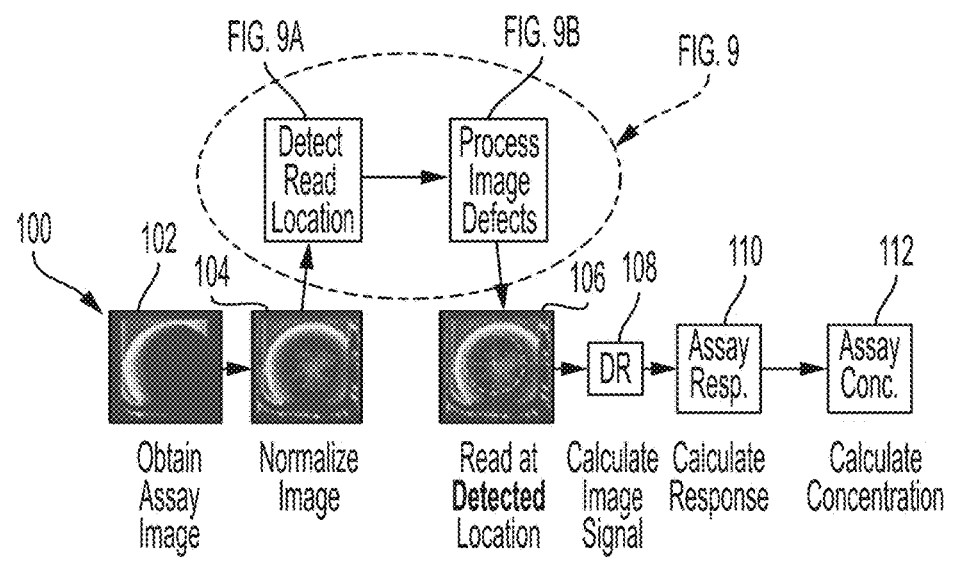
FIG. 8 illustrates a diagram of an example embodiment of a method of performing at least one assay according to the present disclosure.

FIG. 8 illustrates a method 100 for performing at least one assay by taking an image and processing the image as disclosed herein. In an embodiment, the control unit 30 may include a processor and a non-transitory memory storing instructions to perform the steps of method 100. The processor executes the instructions to cause the elements of the assay system 20 to perform the steps of FIG. 8. It should be understood by one of ordinary skill in the art that one or more of the steps shown in FIG. 8 can be omitted and/or additional steps can be added, and/or the order of certain steps can be rearranged, without departing from the spirit and scope of the present disclosure.

At step 102, the imaging device 24 records at least one image of the fluid sample dispensed onto a solid media 10. The image may be recorded, for example, while the light source 26 projects light onto the solid media 10. Light from the light source 26 is configured to cause emission light to be transmitted by target molecules in a sample that have reacted with one or more reagents on the solid media 10 to provide a visual indication of the reaction (e.g., an indicator reaction). In some instances, the optical filter 28 and/or a filter provided by solid media 10 is configured to modulate the light from light source 28. The imaging device 24 may be, for example, a charge-coupled device ("CCD") camera, which may, for example, record a two-dimensional image showing an approximately elliptical or circular fluid sample on the solid media 10. In an embodiment, the wavelength needed for a specific assay may be programmed into or provided to the control unit 30, which may then control the light source 26 and the optical filter 28 so that the correct wavelength light for the assay being performed is projected onto the solid media 10 while the image is recorded by the imaging device 24.

At step 104, the control unit 30 normalizes the image and determines a target location for the assay. Step 104 is shown and described in more detail in FIG. 9 and the corresponding description below. As explained in more detail below, step 104 may include one or more of creating a set of derivative data including a plurality of derivative data points based on the image, determining an image gradient data point for each of the plurality of derivative data points, determining a target location of the fluid sample on the solid media based on the image gradient data points, and removing image defects from the image.

At step 106, the control unit 30 uses the target location determined at step 104 by detecting, for example, a light intensity or other value at the target location and/or at a designated area around the target location. In an embodiment, a designated area around the target location may be formed using the target location as a center point. For example, the target location may be used to create a read area to be used for detecting a signal from the light projected onto the solid media 10. U.S. Provisional Application No. 62/693,120, entitled "Dry Slide Assay Using Reduced Reading Window", filed on Jul. 2, 2018, further describes a method for creating a read area around a target location, and is incorporated herein by reference and relied upon. In other embodiments, the target location may be used, for example, to align an instrument metering system and/or optics, to predict maintenance intervals, and/or to minimize spectral error due to reaction cell interference.

At step 108, the control unit 30 calculates, for example, the mean optical intensity of the image signal from the light projected onto the solid media 10 at the target location and/or within a read area created from the target location. In an embodiment, the mean optical intensity is a sum of the AD count values within the read area, divided by a sum by the total area (total number of pixels) of the read area.

At step 110, the control unit 30 calculates a response using the target location. For end point assays (e.g., UREA), the response may be calculated by the signal differences between two different reads of the same slide or solid media 10. For rate assays (e.g., AST), the response may be calculated by the rate of signal change from multiple reads of the same single slide or solid media 10 over time. Since slide or solid media 10 position may vary slightly over time due to rotation of the incubator, it is desirable to find the target location for each image over the same slid media 10 over time.

At step 112, the control unit 30 finishes performing the assay by calculating the concentration of the fluid sample, for example, using a calibration curve which relates response to concentration. The calibration curve may be obtained in a calibration process using fluids with known concentrations and the obtained responses corresponding to the concentrations. In the calibration curve, concentration is a known function of response. In an embodiment, the control unit 30 may perform multiple different assays using target locations from a plurality of images.

Figure 9A:
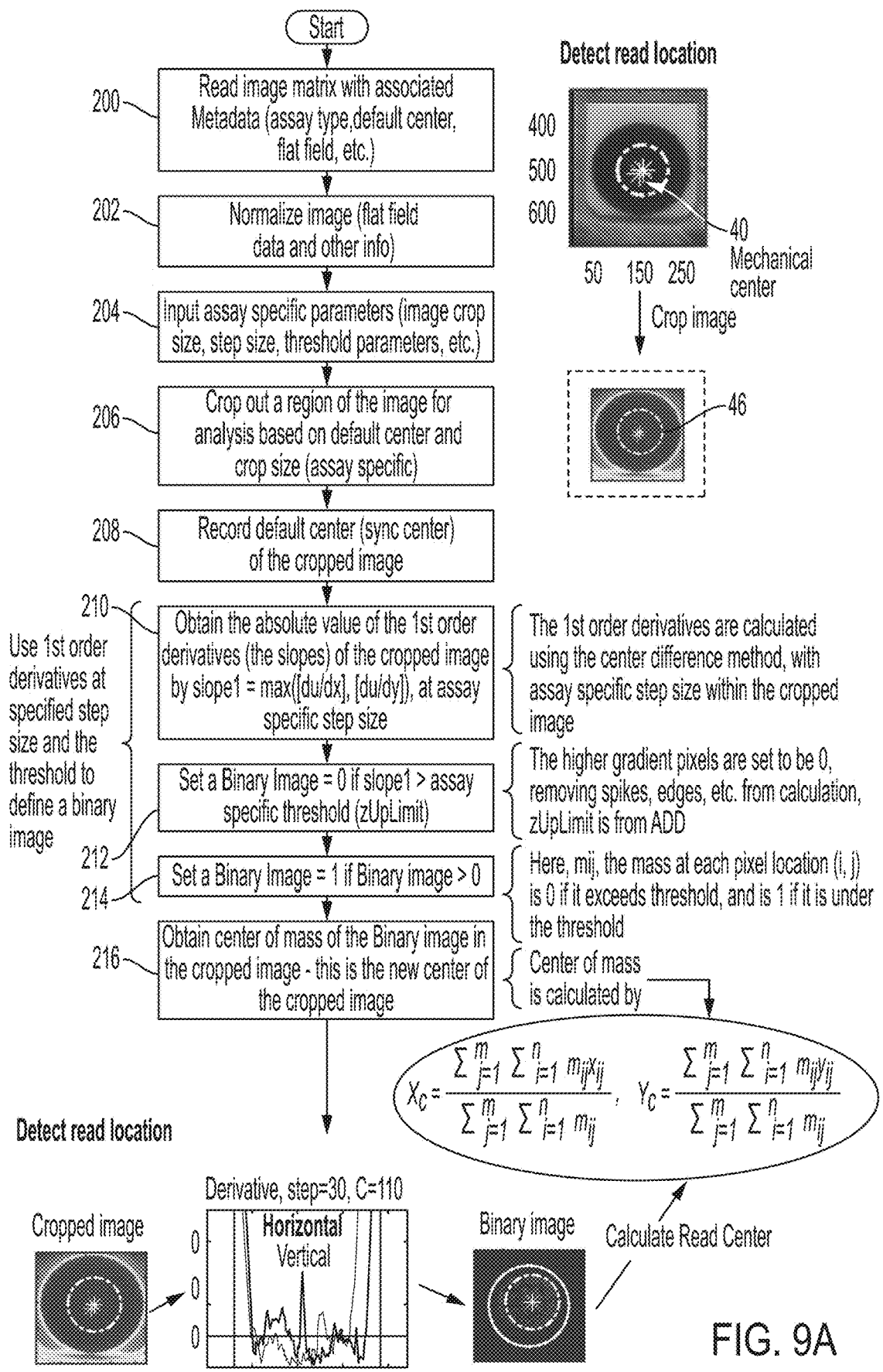
FIGS. 9A and 9B illustrate diagrams of an example embodiment of a method of detecting a target location in an image of a fluid sample on a solid media according to the present disclosure.
Figures 1, 9B:
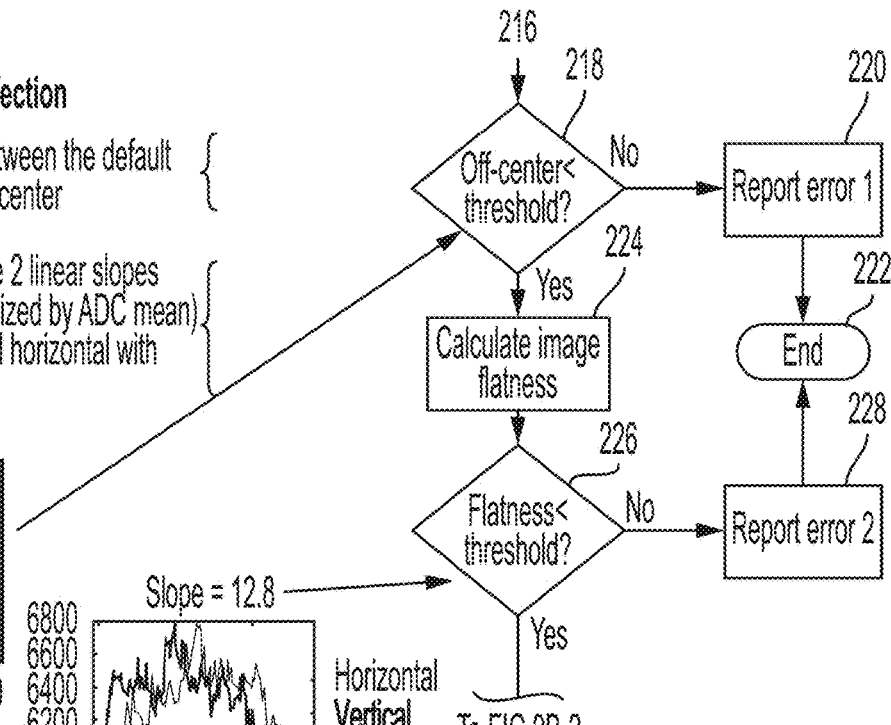
Figures 2, 9B:
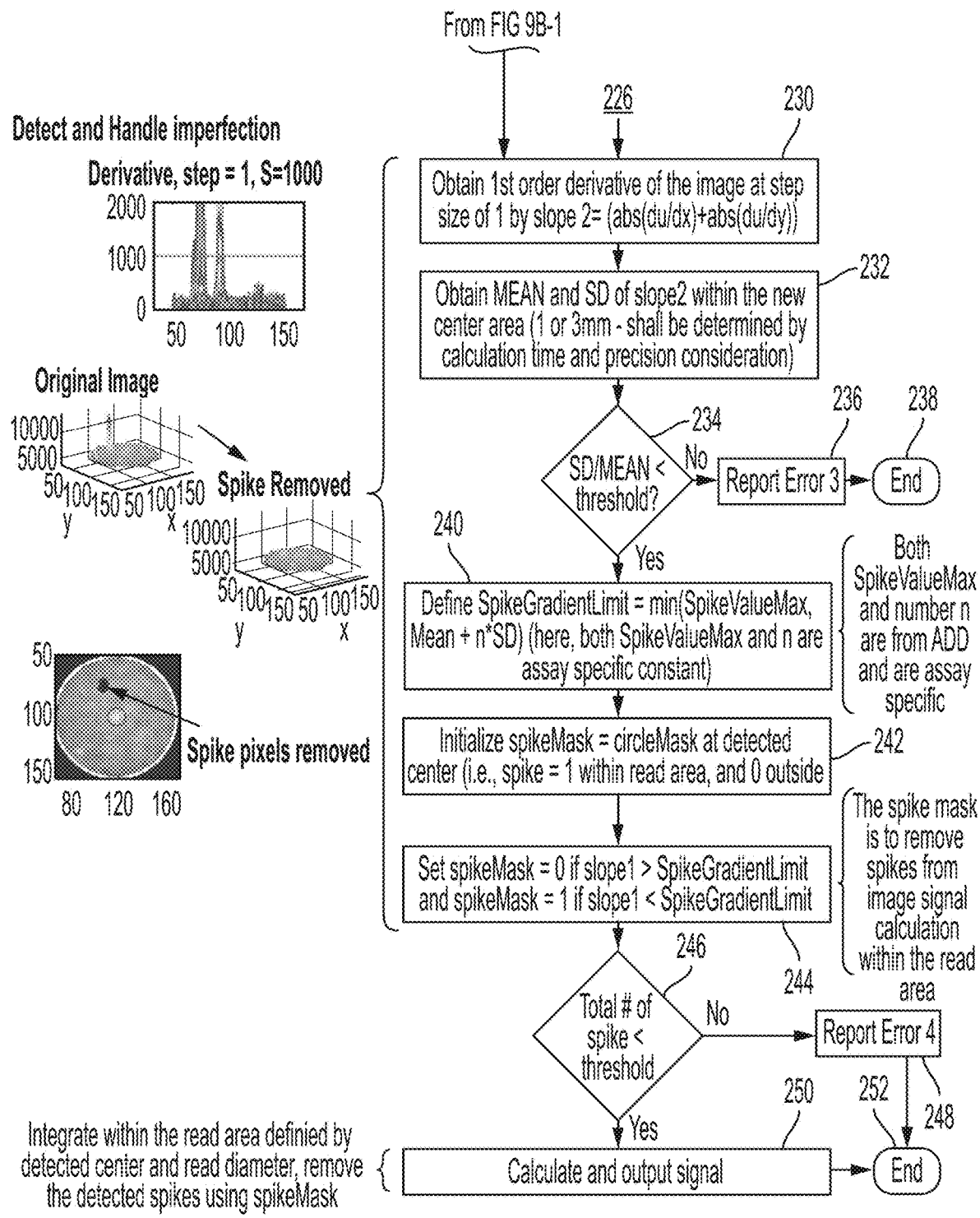

FIGS. 9A and 9B show a method 200 that illustrates step 104 of method 100 in more detail. Specifically, FIGS. 9A and 9B illustrate a specially designed algorithm to detect a target location (FIG. 9A) and process image defects (e.g., either fix the image defects or report an error) (FIG. 9B), which improves assay precision and reduces assay bias and outliers. As explained in more detail below, in detecting a target location (FIG. 9A), the first order derivatives of the image at an assay specific step size are used to obtain image gradients. A threshold is then applied to remove a high gradient region. Finally, a center of the remaining pixels in the image is used as the target location.

After finding the target location (e.g., the center of a homogeneous area with the least variation and highest signal), the image quality may be examined (FIG. 9B) by checking a distance between the target location and a synchronization location, detecting a number of spikes related to the target location, and analyzing axis-symmetry and noise level of the target location. If one or more or the checked quantities exceeds an assay specific threshold, an error code may be issued for the image, indicating that method 100 should then be restarted with a new fluid sample because the analyzed fluid sample may be considered unreliable. If no errors are found, the mean optical intensity of the image at the target location may be calculated as discussed above. In some embodiments, if the number of spikes is below a threshold, the method 200 is configured to remove the spikes from the image, thereby improving repeatability of an assay system. However, if the number of spikes is greater than the threshold, the image may be discarded or associated with an error code and/or alert.

It should be understood by one of ordinary skill in the art that one or more of the steps show in FIGS. 9A and 9B may be omitted and/or additional steps may be added, and/or the order of certain steps may be rearranged, without departing from the spirit and scope of the present disclosure. As with method 100, it should be understood that the control unit 30 may include a processor and a non-transitory memory storing instructions to perform the steps of the method of FIGS. 9A and 9B. The processor executes the instructions to cause the elements of the assay system 20 to perform the disclosed steps.

Step 200 begins with the image recorded by the imaging device 22 at step 102 of FIG. 8. At step 200, the control unit 30 analyzes the image by associating the image with metadata, for example, related to an assay type, a default center 40 of the fluid sample, a type of pattern detected for the fluid sample (e.g., concave, convex, complex), etc. The parameters stored in the metadata may be preprogrammed and stored within the memory of the control unit 30, or may be inputted by a user for a specific assay. The default center 40 of the fluid sample may be, for example, the center of the solid media 10 or the center of the dispense location where the center of the fluid sample is expected to be.

Figure 10:
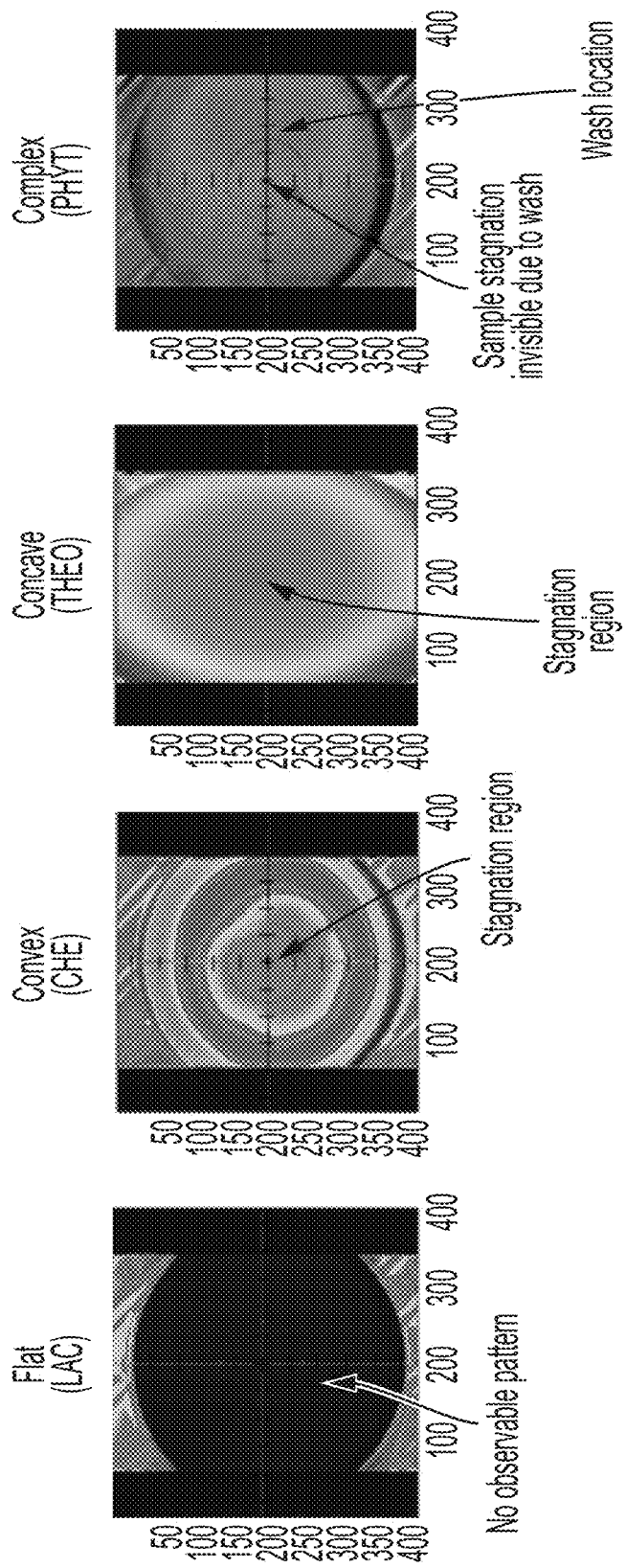
FIG. 10 illustrates a diagram of different example patterns that may be formed by a fluid sample on a solid media.
Figure 11:
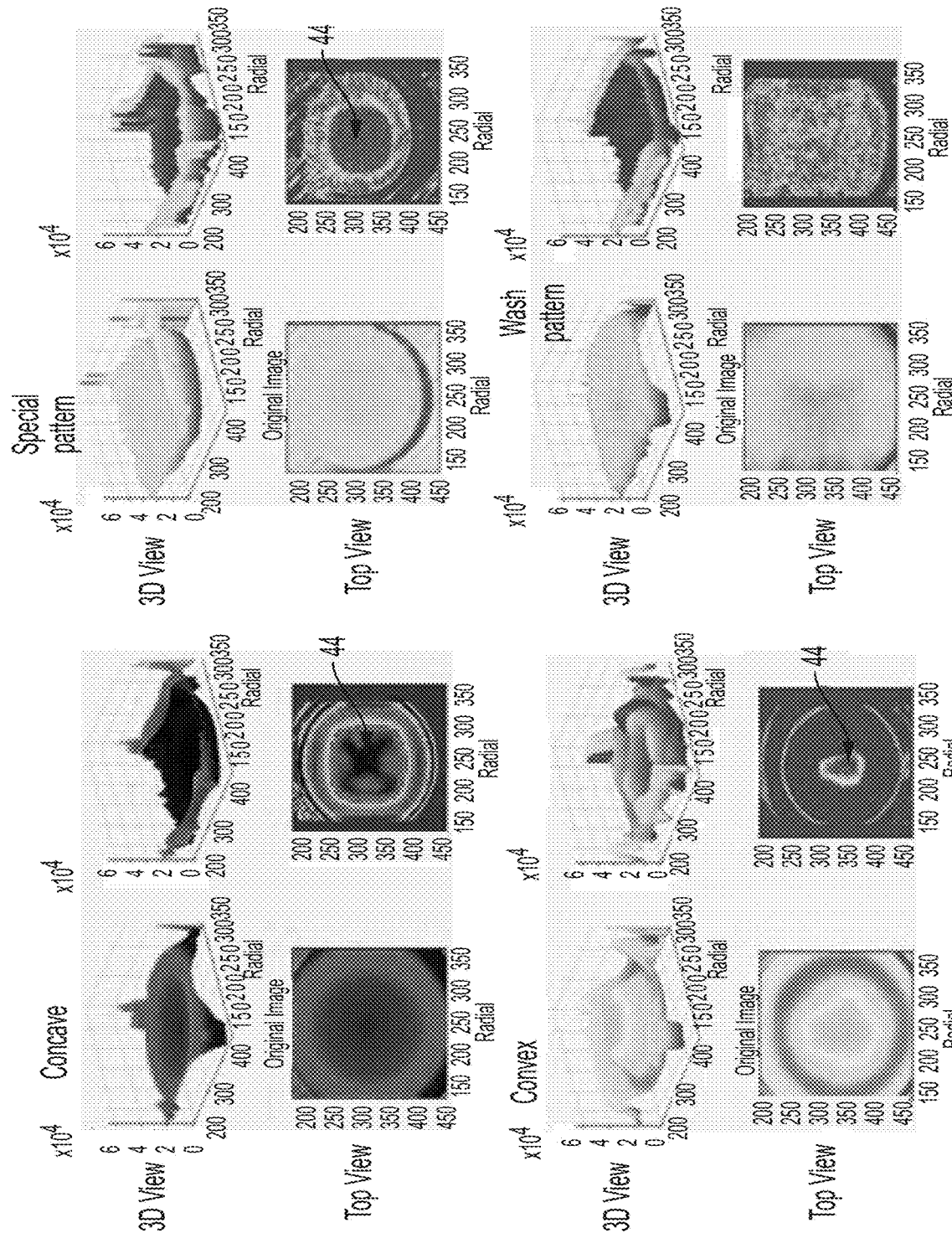
FIG. 11 illustrates original images and first order spatial derivatives that may be formed by a fluid sample on a solid media.

The type of pattern detected for the fluid sample may be flat or non-flat (e.g., concave, convex, or more complex shapes) depending on, for example, sensitivity to the redistribution of the soluble material in the solid media 10, analyte/reagent concentration, and/or the kinetics of the chemistry. FIG. 10 illustrates different example patterns formed by fluids dispensed on a solid media 10, while FIG. 11 illustrates views showing original images and first order spatial derivatives for different assay. FIGS. 10 and 11 shows that there is a smaller value at the stagnation region 44. As illustrated, fluid samples may have, for example, a stagnation region 44 (e.g., peak or valley intensity) with very small gradients, a wash out region with larger gradients, and/or an edge (from wet-dry interface or slide frame) with large gradients. U.S. Provisional Application No. 62/693,120, entitled "Dry Slide Assay Using Reduced Reading Window", filed on Jul. 2, 2018, further describes how a wash out region can affect the image and cause large gradients, the description of which is incorporated herein by reference and relied upon. In accordance with the present method, when a proper threshold is applied, all large gradient regions may be removed and the stagnation region 44 may be identified.

At step 202, the control unit 30 normalizes the image by converting the image to a flat-field image if the image is not already in this form. In an embodiment, normalizing the image includes normalizing the applied light energy across the read area to reduce error. In an embodiment, normalization has two steps. The first step includes subtracting a dark read signal from a raw signal. The dark read signal is the digital signal from the CCD sensor with light sources turned off. This calculation minimizes background digital noise. The second step is to normalize the dark corrected signal using the flat field signal by multiplying the signal by a flat field function. The flat field function may be obtained by reading a standard surface, which is a uniform, flat, white and/or reflective surface. The flat field function may be a function that generates a value of '1' across the surface for the standard surface. Assuming the light intensity distribution as measured is $f=f(x,y)$, the flat field is $F=1/f$.

At step 204, the control unit 30 determines or accepts assay specific parameters, for example, image crop size, step size, threshold parameters, etc. The assay specific parameters may be preprogrammed and stored within a memory of the control unit 30, or may be inputted by a user for a specific assay. The image crop size may be, for example, an intended size for the image to be cropped at step 206, and may be inputted or automatically generated by the control unit 30. In an example embodiment, the image crop size may be approximately 4.5 mm in diameter around a central point (e.g., default center 40). The step size and threshold parameters are likewise inputted or predetermined values used for later steps of the process. Each assay may have its own crop size, step size and thresholds (e.g., URIC crop size=3.64 mm, step size 0.28 mm, and threshold=10).

At step 206, the control unit 30 crops out a region 46 of the image. In an example, the control unit 30 crops out a region 46 based on an expected location of a default center 40 of the fluid sample on the solid media 10. In an embodiment, the default center 40 is known from step 200 as, for example, the center of the solid media 10 or the center of the dispense location where the center of the fluid sample is expected. The image can therefore be cropped, for example, as a circle (e.g., a circle having a 4.5 millimeter ("mm") diameter) surrounding the default center 40 based on the image crop size determined at step 204. In another embodiment, the image may be cropped based on a detected light intensity without being limited to any particular size. U.S. Provisional Application No. 62/693,120, entitled "Dry Slide Assay Using Reduced Reading Window", filed on Jul. 2, 2018, further describes how to crop out an area of an image to create a read area, the description of which is incorporated herein by reference and relied upon.

At step 208, the control unit 30 records the default center 40 of the cropped image. In an embodiment, the default center 40 is known from step 102 and the image is cropped based on the default center 40. In another embodiment, the default center 40 may not correspond to the center of the cropped image and may by determined based on the newly cropped image. For example, the image may be cropped based on light intensity at step 206, and the default center 40 may then be recorded as the geometrical center of the cropped image.

At steps 210 to 214, the control unit 30 creates a set of derivative data including a plurality of derivative data points based on the cropped image. In an embodiment, the derivative data points may be first order derivatives based on colors in the image, and may each include an image gradient data point defining a binary image. In an embodiment, the colors in the at least one image represent light intensity. In an embodiment, the first order derivatives are of the image light intensity in space. For example, each pixel in the image has a unique light intensity as measured by AD count (i.e., ADC). The first order derivative may be the difference of light intensity between pixels at pre-defined distances divided by the distance between the pixels.

At step 210, the control unit 30 creates a set of derivative data by obtaining the absolute values of the first order derivatives (e.g., slopes) of the cropped image at the assay specific step size determined at step 204. The first order derivatives may be calculated using the center difference method, with the assay specific step size within the cropped image. For example, the set of derivative data may be determined using the following equation:

$$Slope_1 = \max(|du/dx|, |du/dy|).$$

Here, u is the light intensity at a pixel in the image (the AD count value). x and y are a coordinate location of that pixel. The slope may be calculated along both the x and y directions, and the maximum absolute values may be defined as the slope. The step size for calculating the derivatives is assay specific. As explained in more detail below, if $Slope_1$ is less than a threshold, its mass has a value of '1', otherwise, its mass has a value of '0'.

At steps 212 and 214, the control unit 30 determines an image gradient data point for each of a plurality of derivative data points of the set of derivative data, thereby generating a binary image. In an embodiment, at step 212, the control unit 30 sets an image gradient data point to zero (0) if $Slope_1$ determined at step 210 is greater than an assay specific threshold. That is, the higher gradient pixels are set to be zero (0), removing spikes, edges, etc. from the binary image. Then, at step 214, the control unit 30 sets an image gradient data point equal to a value of one (1) if an image gradient data point is greater than a value of zero (0). That is, the image gradient data point (e.g., the mass at a location in the binary image) at each pixel location is zero (0) if $Slope_1$ exceeds the threshold, and is one (1) if $Slope_1$ is under the threshold. In an embodiment, first image gradient data points having a lower image gradient than second image gradient data points are included or set to one (1), and/or (ii) second image gradient data points having a higher image gradient than the first image gradient data points are excluded or set to zero (0).

At step 216, the control unit 30 determines the target location of the (e.g., elliptical or circular) fluid sample based on the image gradient data points. For example, the target location may be calculated as a center of mass of the binary image (e.g., the binary image shown in FIG. 9A). In an embodiment, the central location may be obtained using the following equations:

$$X_c = \frac{\sum_{j=1}^{m}\sum_{i=1}^{n} m_{ij} x_{ij}}{\sum_{j=1}^{m}\sum_{i=1}^{n} m_{ij}}, \quad Y_c = \frac{\sum_{j=1}^{m}\sum_{i=1}^{n} m_{ij} y_{ij}}{\sum_{j=1}^{m}\sum_{i=1}^{n} m_{ij}}$$

In the equations, the mass $m_{ij}$ is a function of its location index i and j. The coordinate value $x_{ij}$ and $y_{ij}$ are also functions of the location index i and j. The mass is equal to a value of '1' or '0' depending on whether it is within a threshold across all indexes. The center $X_c$ coordinate is calculated by summing the product between the mass and the corresponding x coordinate across all indexes and then dividing the sum product by the total mass. Similarly, the center $Y_c$ coordinate is calculated by summing the product between the mass and the corresponding y coordinate across all indexes and then dividing the sum product by the total mass.

The center of mass of the binary image may then be designated as the target location of the fluid sample on the solid media 10, which is an approximate geometrical center of the homogeneous region of the fluid sample on the solid media 10.

Figure 12:
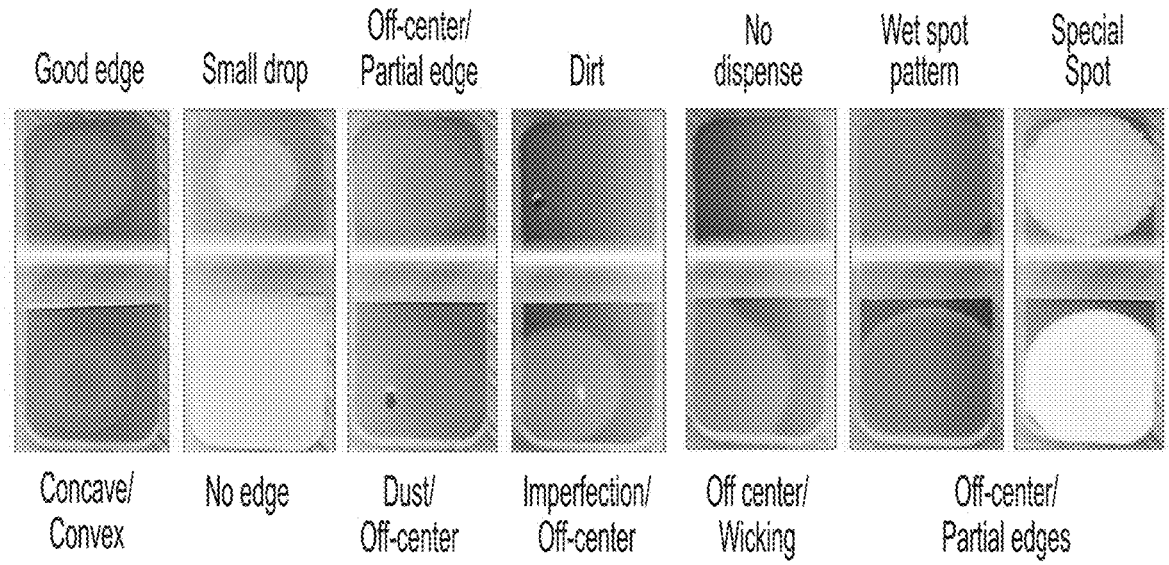
FIG. 12 illustrates diagrams of different imperfections that may form within an image of a fluid sample on a solid media.

At steps 218 to 252 of FIG. 9B, the control unit 30 is configured to detect and/or remove defects from the image (e.g., due to imperfections in the image, dust, coating defects, wicking, foreign particles, bubbles, scratches, etc.) and/or determine an error condition based on the target location (i.e., the determined center of the fluid sample from step 216). The error may also be indicative of a problem with the reflectometer illumination system of the assay system 20, such as dirty projector optics. As illustrated, for example, by FIG. 12, there are many different imperfections in an image (e.g., dust, off-center dispense, wicking, foreign particles, bubbles, scratches, etc.), which can negatively affect an assay.

At step 218, the control unit 30 compares the target location determined at step 216 to the default center 40 determined previously. In an embodiment, if the distance between the default center and the target location is greater than a threshold, the control unit 30 may report an error at step 220 and end the analysis at step 222. This may mean that method 100 should then be restarted with a new fluid sample because the analyzed fluid sample is considered unreliable.

At step 224, the control unit 30 considers whether the flatness of the image is less than a threshold. In an embodiment, the flatness of the image is the largest of two linear slopes (absolute value and normalized by ADC mean) across the center vertical and horizontal lengths of the cropped image. Since the AD count value (ADC) varies in a large range (e.g., from 1,000 to 50,000) depending on the analyte concentration in the sample, the AD count value is normalized by dividing the AD count value to its mean value. In this way, the slope change is more related to the flatness rather than the analyte concentration. The mean value of the AD count is obtained, and then the AD count value is divided by the mean value. The slope can be either positive or negative since the absolute value of the slope is used to determine if the image is flat. Although the image maybe concave or convex in light intensity distribution, it is axis-symmetric by the center (the dispense location).

If the flatness of the image is less than the threshold at step 226, the control unit 30 may report an error at step 228 and end the analysis at step 222. This may indicate that the method 100 should then be restarted with a new fluid sample because the analyzed fluid sample is considered unreliable.

At step 230, the control unit 30 creates a first order derivative of the cropped image at a determined step size (e.g., a step size of one (1)). For example, the first order derivative data may be determined using the following equation:

$$Slope_2 = |du/dx| + |du/dy|.$$

At step 232, the control unit 30 obtains the mean (MEAN) and standard deviation (SD) of $Slope_2$ within the new center area. At step 234, the control unit 30 determines whether the standard deviation/mean is below a threshold. If the standard deviation/mean is below a threshold, the control unit 30 may report an error at step 236 and end the analysis at step 238. This may mean that the method 100 should then be restarted with a new fluid sample because the analyzed fluid sample is considered unreliable.

At step 240, the control unit 30 may define two assay specific constants: SpikeValueMax and n. In an embodiment, SpikeValueMax represents a value determined by assay performance experiments and is provided for each assay, while n represents a positive number and is used to calculate a value to define the spike detection threshold SpikeGradientLimit. The control unit 30 may then define a SpikeGradientLimit using, for example, the following equation:

$$SpikeGradientLimit = min(SpikeValueMax, MEAN + n*SD).$$

In the above equation, the minimum value of SpikeValueMax and MEAN+n*SD is used to define the threshold SpikeGradientLimit that is used to detect if the slope exceeds the limit in the image read area.

At steps 242 and 244, the control unit 30 removes large gradient spikes from the cropped image. In an example embodiment, spikes are removed by defining a SpikeMask, where SpikeMask equals a value of zero (0) if $Slope_1$ at a point is greater than the SpikeGradientLimit, and SpikeMask equals a value of one (1) if $Slope_1$ at a point is less than the SpikeGradientLimit. In another embodiment, spikes may be removed based on being above or below a predetermined threshold.

At step 246, the control unit 30 determines the total number of spikes detected at steps 240 and 242. If there are a small number of spikes detected and removed from the image, the rest of the pixels in the image can still be used to calculate the signal for that solid media 10. But if the number of spikes detected exceeds a pre-defined limit based on assay experiments, then the control unit 30 may report an error at step 248 and end the analysis at step 252. This may mean that the method 100 should then be restarted with a new fluid sample because the analyzed fluid sample is considered unreliable.

At step 250, the control unit 30 integrates within the cropped image defined by the target location, removing the detected defects, so that the resulting image can be used for step 106 of method 100.

Figure 13:
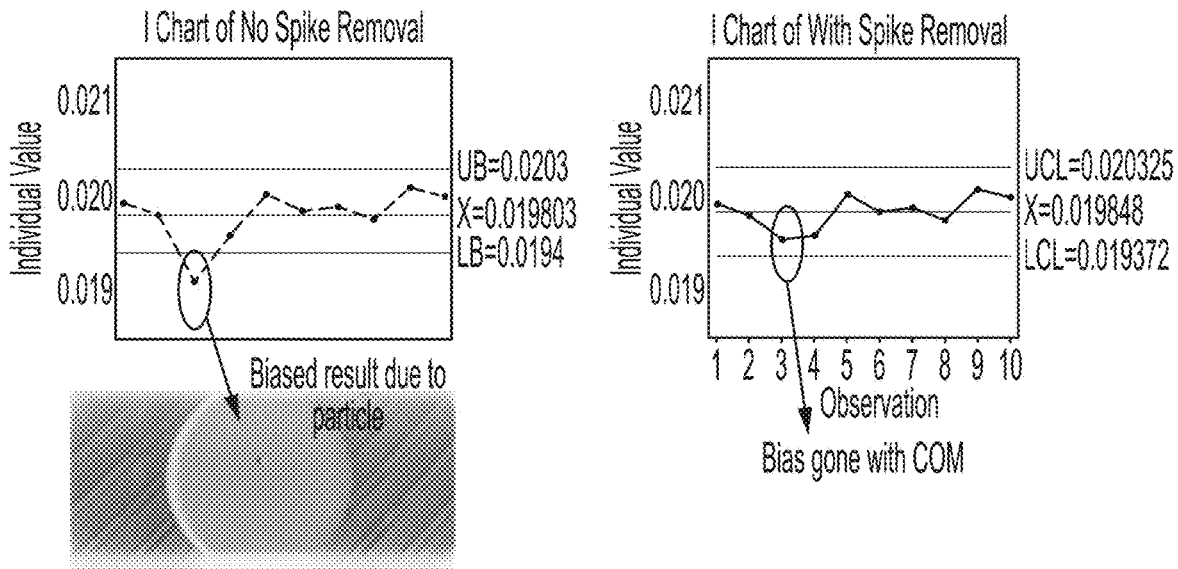
FIG. 13 illustrates a diagram of how a speck of dust on a solid media can cause a spike in a corresponding image.

FIG. 13 illustrates an example of how a speck of dust on a solid media 10 can cause a spike in a corresponding image. As illustrated, by removing the spike, any bias to an assay performed using the image can also be removed, making the assay more reliable.

Figure 14:
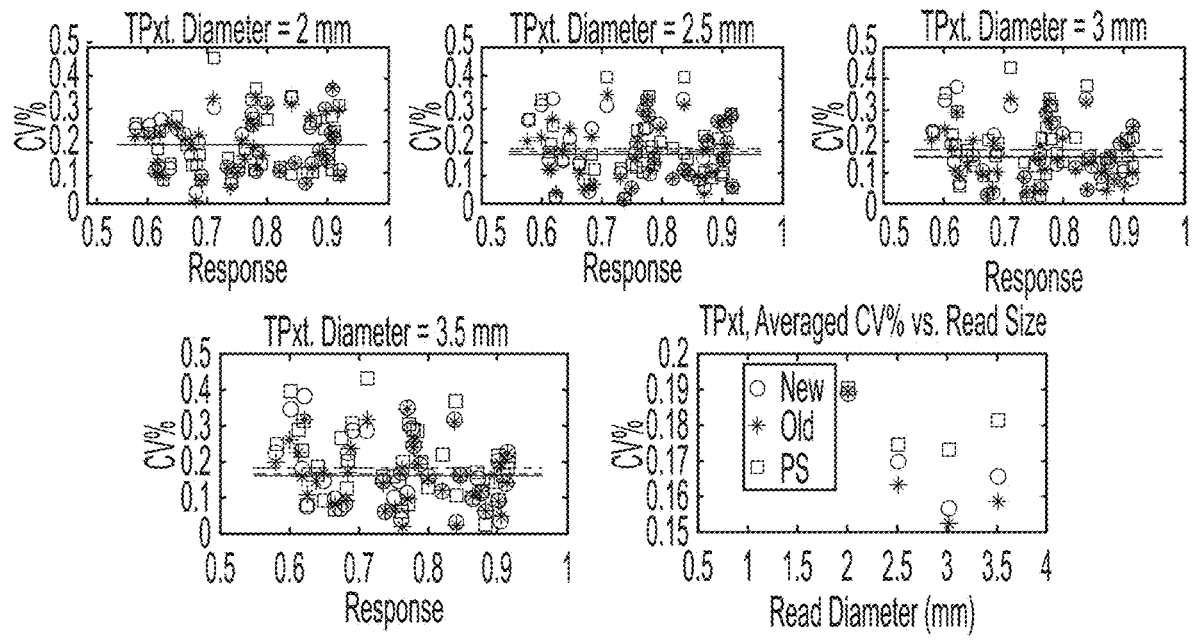
FIG. 14 illustrates a diagram of how the method according to the present disclosure improves assay precision.
Figure 15:
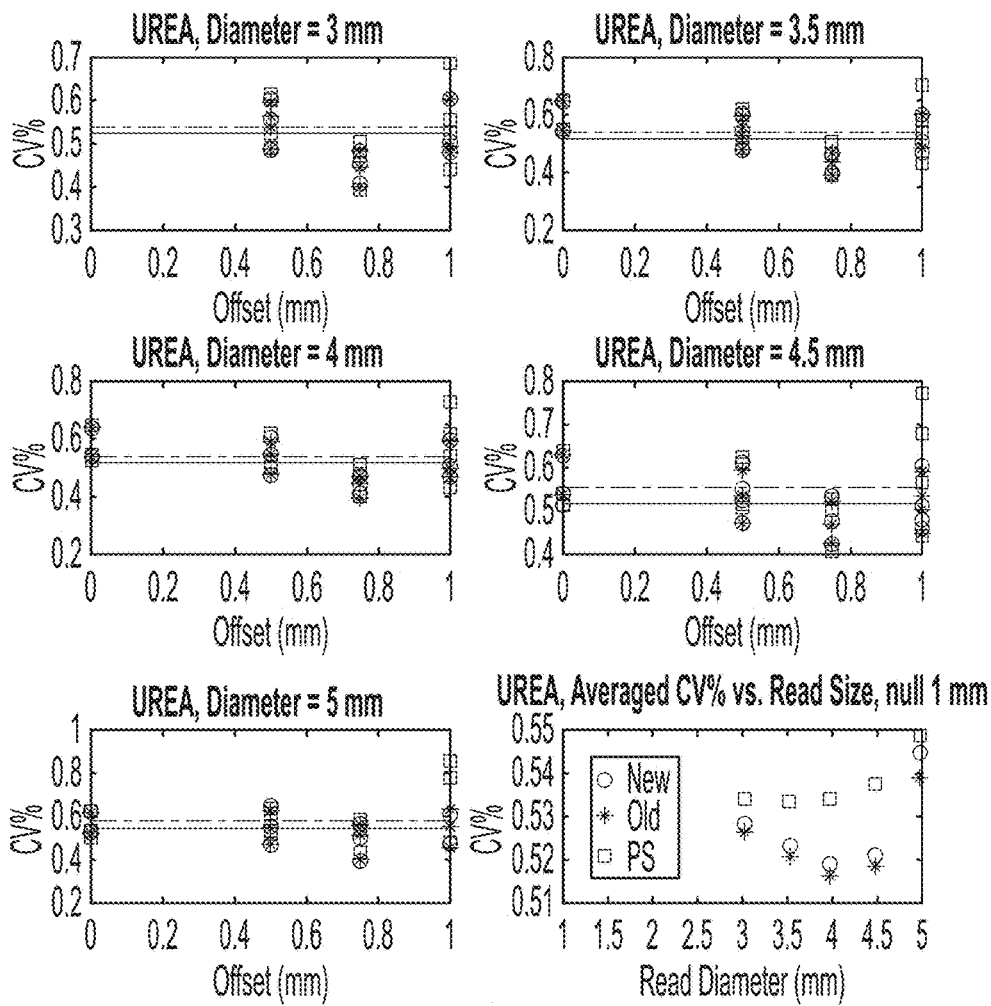
FIG. 15 illustrates a diagram of how the method according to the present disclosure improves assay precision.

FIGS. 14 and 15 illustrate the advantages accomplished by the presently disclosed method. In FIG. 14, TPxt means the assay is TP ("Total Protein") in multi-test format (two tests per slide). COM (shown as circles) represents the precision when read at the target location that was found with the presently disclosed method. PS (shown as squares) represents the precision when read at the pre-assigned center (e.g., an assumed dispense location) without knowing the real dispense location. The coefficient of variation (CV %) at each read diameter is the average of all samples tested.

Figure 16:
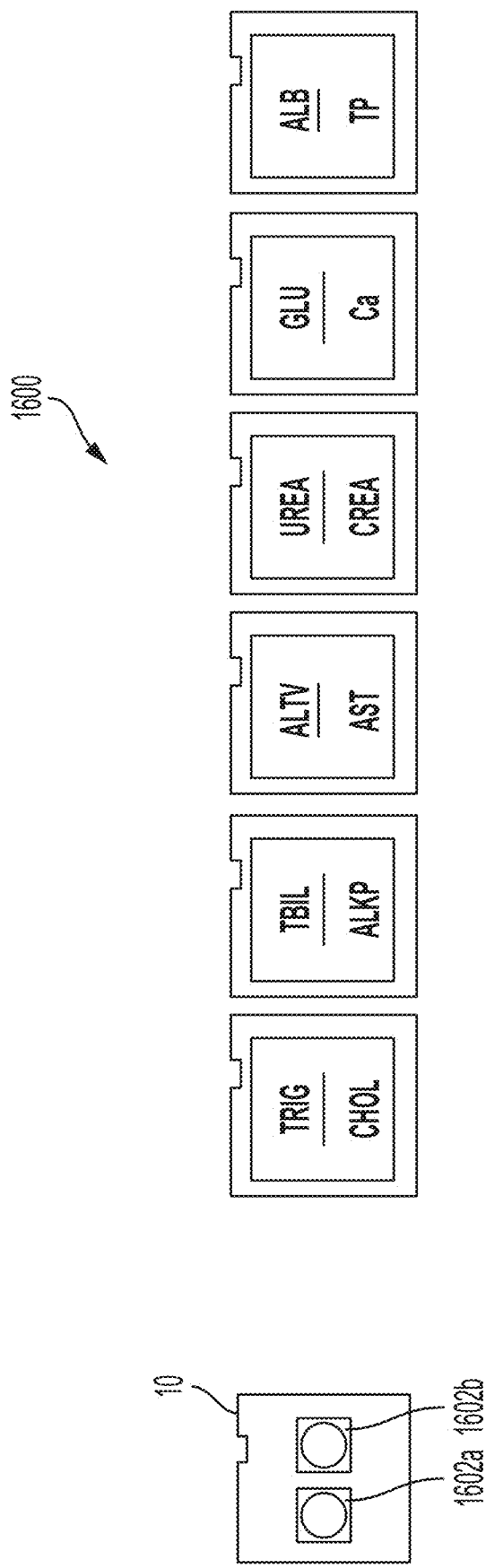
FIG. 16 illustrates a diagram of an embodiment of the solid media of FIGS. 1 to 5, according to an example embodiment of the present disclosure.

FIG. 16 illustrates an embodiment of the solid media 10 of FIGS. 1 to 5, according to an example embodiment of the present disclosure. The solid media 10 of FIG. 16 includes two chemistry chips 1602a and 1602b, corresponding to stagnation region 44, discussed above. As discussed, a stagnation region corresponds to a region of a chemistry chip that is directly below an opening of a fluid metering tip. The stagnation region 44 may also characterized by having very little or no flow of fluid in the radial direction. Located outward radially from a spot center and region, fluid flow vectors exist that point away from the center of the chemistry chip. There is some amount of chemistry chip reagent wash out in this area. The stagnation zone or region 44 does not experience this wash out and can have a different optical density once the chemical reactions are complete compared to the areas outside the stagnation region 44. In some examples, the stagnation zone or region 44 does not have a significant level of radial fluid flow, which produces an area of low optical variability and an area of high indicator (dye) presence.

In some instances, the chemistry chips and/or stagnation regions 44 correspond to target locations of a fluid sample in a reaction cell. A target location or chemistry chip corresponds to a location where an indicator reaction occurs such that an indicator is developed for display as target molecules in a fluid sample react with reagents in the reaction cell. In some examples, the chemistry chips 1602a and 1602b may each include a liquid filled reaction cuvette. In these examples, imaging of a reaction cuvette may show bubbles, debris, and/or scratches on the cuvette wall. The identified defects can be identified and their impact mitigated in relation to analysis and assay results.

The use of chemistry chips 1602 reduces the area needed for a sample, and enables more than one sample to be dispersed on the slide. Each of the chemistry chips 1602 may receive the same fluid from a sample to enable the same or different analyses using the same solid media 10. Alternatively, the chemistry chips 1602 may each receive a different fluid to enable the same or different analyses using the same slide 10. Further, while FIG. 16 shows two chemistry chips 1602, in other examples, the solid media 10 may include additional chemistry chips, such as three, four, etc. It should be appreciated that the inclusion of more than one chemistry chip on the solid media 10 improves operational efficiency of the assay system 20 since multiple analyses can be performed on the same solid media 10 without having to move the solid media. In comparison, solid media with only a single chemistry chip require the processing of two or more separate solid media to conduct the same analysis as a single solid media 10 with multiple chemistry chips.

FIG. 16 also shows examples of chemistry product solid media combinations. The combinations include triglyceride-cholesterol (TRI-CHOL), total bilirubin-alkaline phosphatase (TBIL-ALKP), alanine aminotransferase-aspartate aminotransferase (ALTV-AST), urea-creatinine (UREA-CREA), glucose-calcium (GLU-Ca), and albumin-total protein (ALB-TP). It should be appreciated that other combinations can be created and implemented on the solid media 10.

Figure 17:
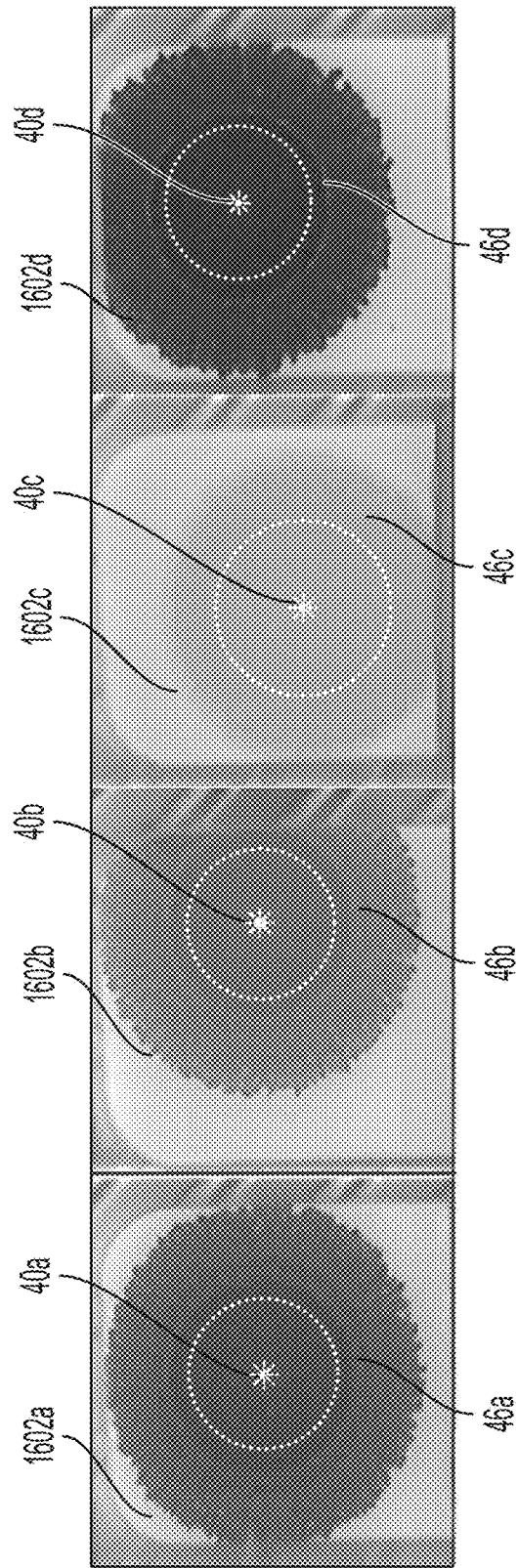
FIG. 17 illustrates a diagram of images recorded by the assay system of FIG. 3, which include samples placed on stagnation regions of respective slides, according to example embodiments of the present disclosure.

FIG. 17 shows images recorded by the assay system of FIG. 3, which include samples placed on chemistry chips 1602 of respective solid media 10, according to example embodiments of the present disclosure. As discussed above, dispensing of a sample of fluid creates a liquid lens 46 on a chemistry chip 1602. The example solid media 10 of FIG. 17 are configured to reduce sample size and enhance operational efficiency of the assay system 20 while maintaining analytical performance verses known conventional single slide tests. Due to a small sample volume placed in the respective chemistry chip 1602, the size of the region for analytical measurement is reduced. In some examples, the assay system 20 may use digital chemistry technology, as discussed above, to mitigate against possible performance sensitivities. As shown in FIG. 17, digital chemistry uses wavelength-specific LEDs to record or capture images of the solid media 10 on a digital image reflectometer. The assay system 20 uses one or more imaging algorithms to improve chemistry results by ensuring that the optimal region of the sample is analyzed (as discussed above), even in the presence of variation of a metering position or inclusion of containments (e.g., dust).

As shown in FIG. 17, the assay system 20 uses imaging algorithms to determine a center 40, shown as centers 40a to 40d of respective chips 1602a to 1602d. As discussed above, the center 40 may or may not be the same as a default center, which is a theoretical spot center if the dispensing tip and slide were aligned perfectly. The assay system 20 then analyzes a certain radius around the center 40. The radius is between 1 mm and 8 mm, preferably around 2.25 mm, shown by the dashed line in the figures.

Figure 18:
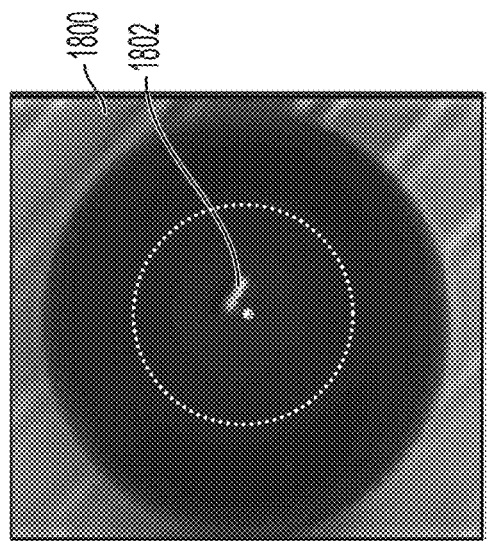
FIGS. 18 and 20 illustrate images recorded by the assay system of FIG. 3 in which dust or another contaminant is included in the sample, according to an example embodiment of the present disclosure.
Figure 19:
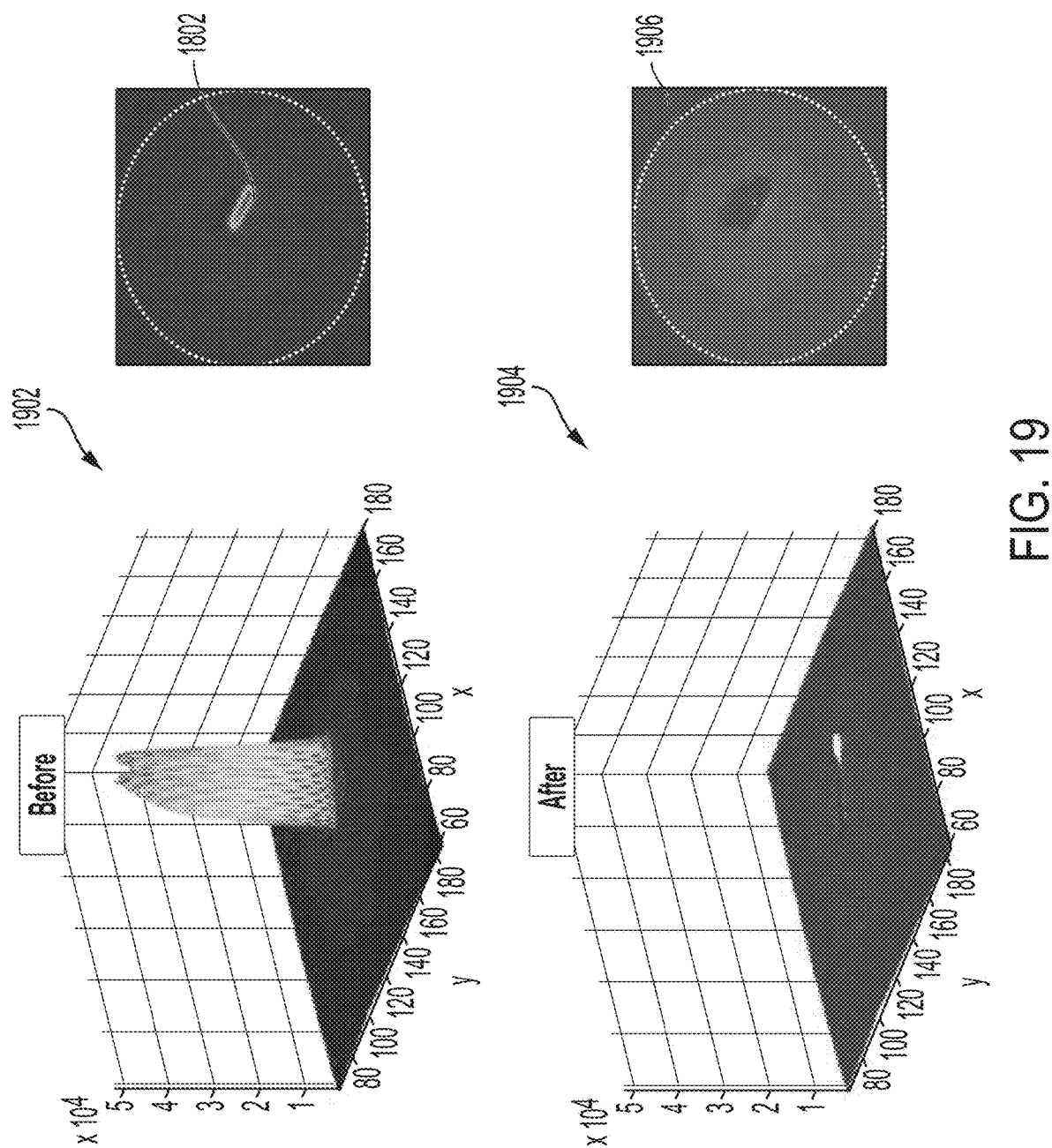
FIGS. 19 and 21 illustrate diagrams showing an analysis of samples performed by the assay system based on the images of FIGS. 18 and 20.

FIG. 18 shows an image 1800 recorded by the assay system 20 of FIG. 3 in which dust or another contaminant 1802 is included in the sample, according to an example embodiment of the present disclosure. FIG. 19 shows an analysis of the sample of FIG. 18 performed by the assay system 20 using the method disclosed herein. A first graph 1902 shows analysis results before the anomaly 1802 is detected and removed. A second graph 1904 shows analysis results after the anomaly 1802 is detected and removed. In the illustrated example an imaging algorithm detects the anomaly and removes the anomaly from a processed image 1906 (derived from the image 1800 of FIG. 18). As a result, the anomaly is not included in the subsequent analysis of the sample. In some examples, the assay system 20 removes the anomaly by changing pixel colors associated with the anomaly to a color that is consistent with surrounding pixel colors or a pixel color that is indicative of no data for subsequent analysis.

Figure 20:
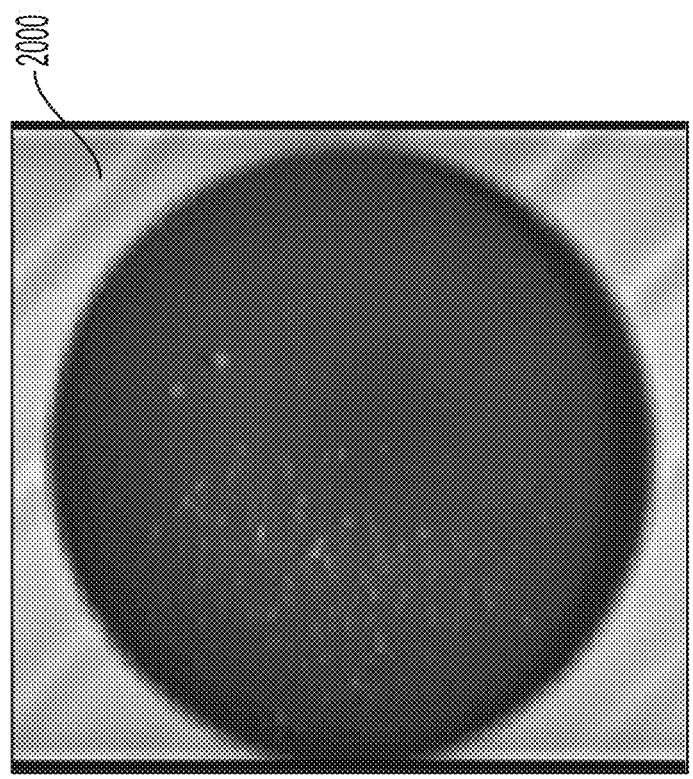
Figure 21:
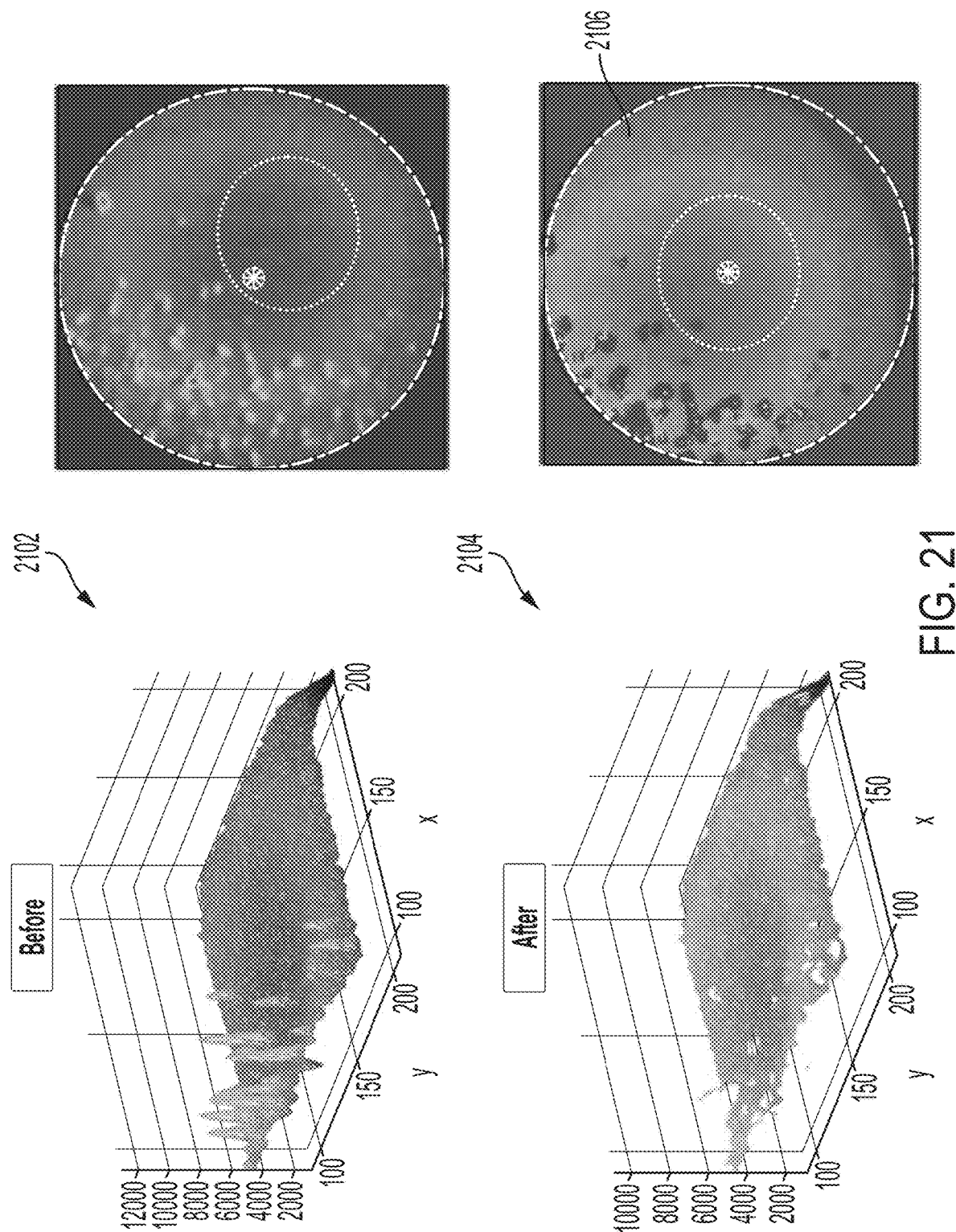

FIG. 20 shows another image 2000 recorded by the assay system 20 of FIG. 3 in which dust or another contaminant is included in the sample, according to an example embodiment of the present disclosure. FIG. 21 shows an analysis of the sample performed by the assay system 20. A first graph 2102 shows analysis results before the anomaly is detected and removed. A second graph 2104 shows analysis results after the anomaly is detected and removed. Similar to the previous example, the imaging algorithm detects the anomalies and removes the anomalies from a processed image 2106 (derived from the image 2000 of FIG. 20). As a result, the anomalies are not included in the subsequent analysis of the sample. Additionally, the assay system 20 is configured to move the center 40 of the image 2106 such that it reduces or minimizes a number of anomaly-corrected locations that are included within the analysis field (e.g., the circle around the center).

FIGS. 22 to 37 show test result data comparing analytic performance of the example solid media 10 of FIGS. 1 to 21 to known slides or solid media. In the illustrated example of FIGS. 22 and 23, the solid media 10 were analyzed using the assay system 20 while the known slides or solid media were analyzed using known conventional assay systems. In the example, six of the example solid media 10 for two serum concentrations were evaluated using quality control materials on the example assay system 20. Total within-lab precision for performance (reported as a percent coefficient of variance (% CV)) for a single calibration was evaluated with two runs per day, with two replicates per run over twenty days, for a total of eighty replicates, following CLSI EP05 guidelines. The worst-case within-lab precision for the example solid media 10 analyzed by the assay system 20 was compared to corresponding single prior art test slides analyzed using a conventional assay system.

The % CV corresponds to a ratio of a standard deviation to a mean for the sample data, which provides an indication of precision and repeatability in an assay, with lower values corresponding to greater precision and repeatability.

Figure 23:
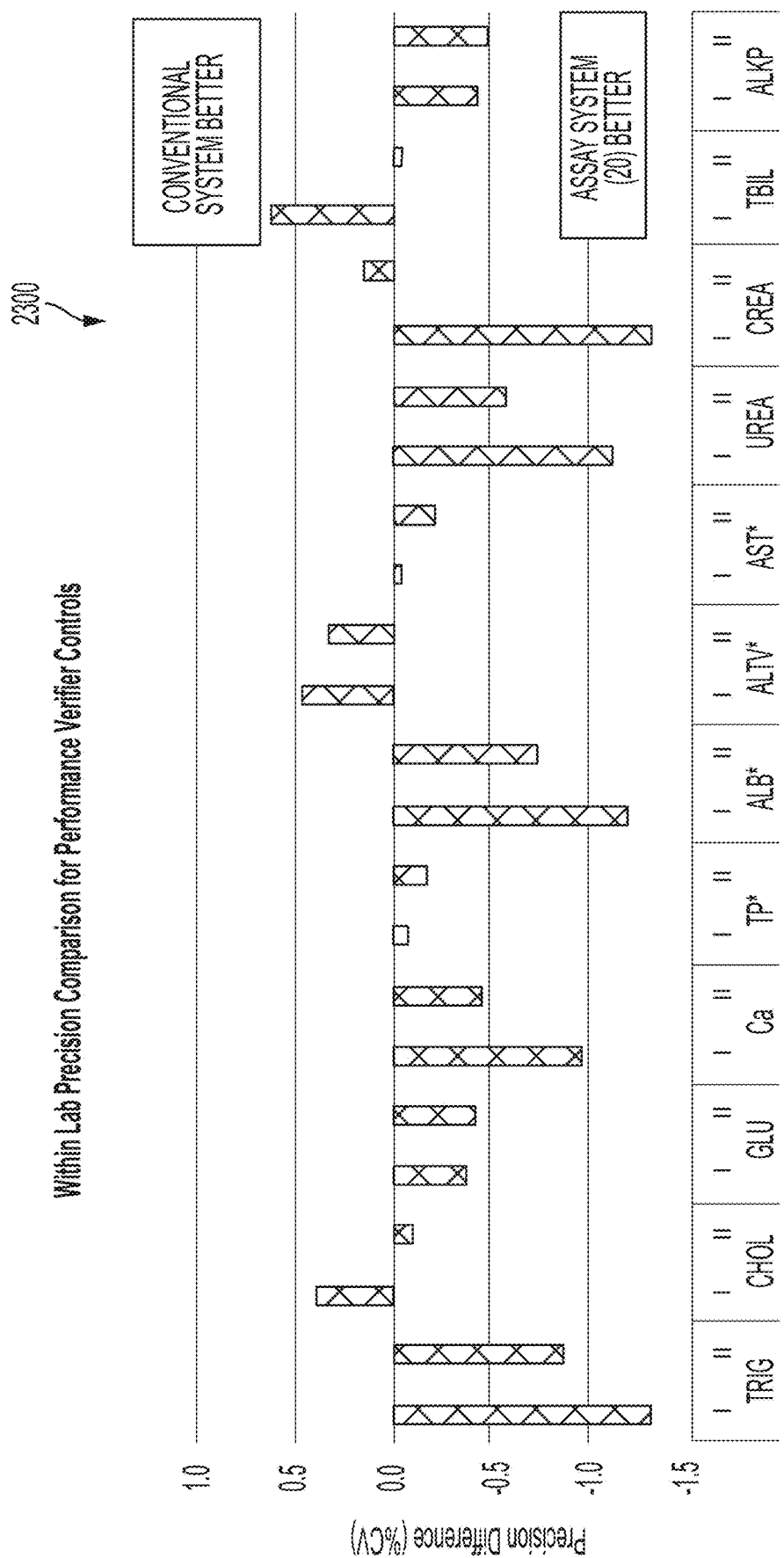

FIG. 22 illustrates a diagram of a table 2200 that shows the two serum levels for each slide chemistry (UREA, TRIG, GLU, ALB, TBIL, ALTV, CREA, CHOL, CA, TP, ALKP, and AST), and the corresponding % CV for the prior art slide using a conventional assay system and the example solid media 10 using the example assay system 20. As illustrated, of the twenty-four different tests, the solid media 10 using the assay system 20 had a lower % CV for nineteen of the twenty-four different tests. FIG. 23 shows a graph 2300 that illustrates the % CV difference for each of the different slide chemistry tests between the known prior art slides and the example solid media 10 disclosed herein analyzed using the assay system 20. As shown, the use of the example solid media 10 with the assay system 20 provided a better % CV for most slide chemistries compared to the prior art slides.

In the illustrated example of FIGS. 24 to 37, an external precision study was conducted. In this study, the prior art test slides were analyzed using a conventional assay system. The test slides with the twelve chemistries were analyzed for two serum concentrations. Statistical data outliers were removed from the analysis. A Shapiro-Wilk normality test was run on the remaining data, with sets demonstrating severe deviations from normality being removed. The % CV was calculated for each slide serum-reagent lot combination. The % CV metrics were averaged within a reagent lot and compared to worse-case within-lab precision for the example solid media (10) analyzed by the example assay system 20.

Figure 25:
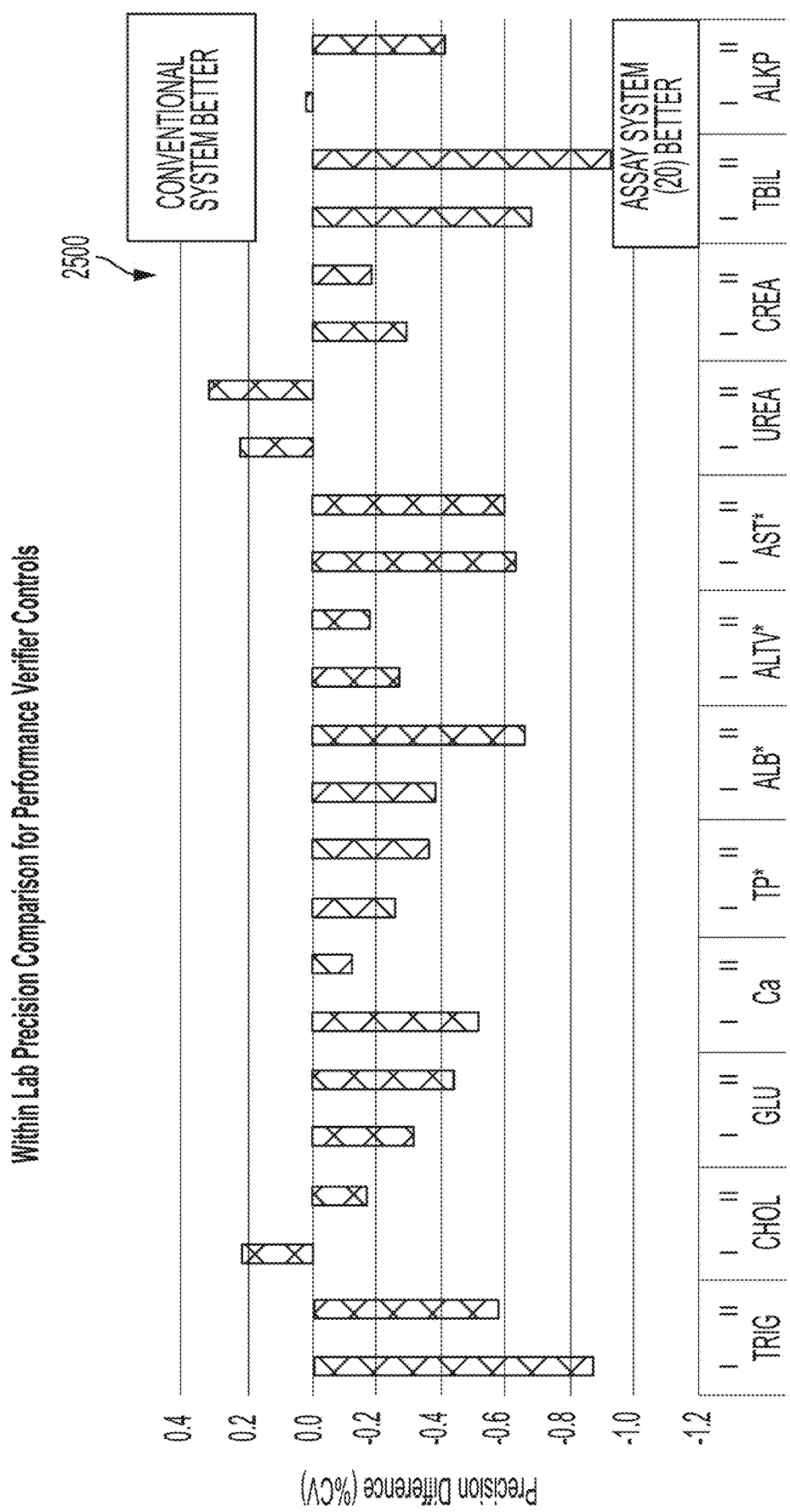

FIG. 24 illustrates a diagram of a table 2400 that shows the two serum levels for each slide chemistry (UREA, TRIG, GLU, ALB, TBIL, ALTV, CREA, CHOL, CA, TP, ALKP, and AST) and the corresponding % CV for the prior art slide using a conventional assay system and the example solid media 10 using the example assay system 20. As illustrated, of the twenty-four different tests, the solid media 10 using the assay system 20 had a lower % CV for twenty of the twenty-four different tests. FIG. 25 shows a graph 2500, which illustrates the % CV difference for each of the different slide chemistry tests between the known prior art slides and the example solid media 10 disclosed herein analyzed using the assay system 20.

FIGS. 26 to 37 show graphs illustrating results for each reagent lot number for the example solid media 10 and the known prior art slides. In the graphs, the solid media 10 were provided with three lots, and are referred to as "XT . . . Lot #". In addition, data related to the prior art slides is referred to as "ST . . . from Field" and "ST Average". Each of the graphs provides the precision % CV for each of the serums (PVI) and (PVII).

Figure 26:
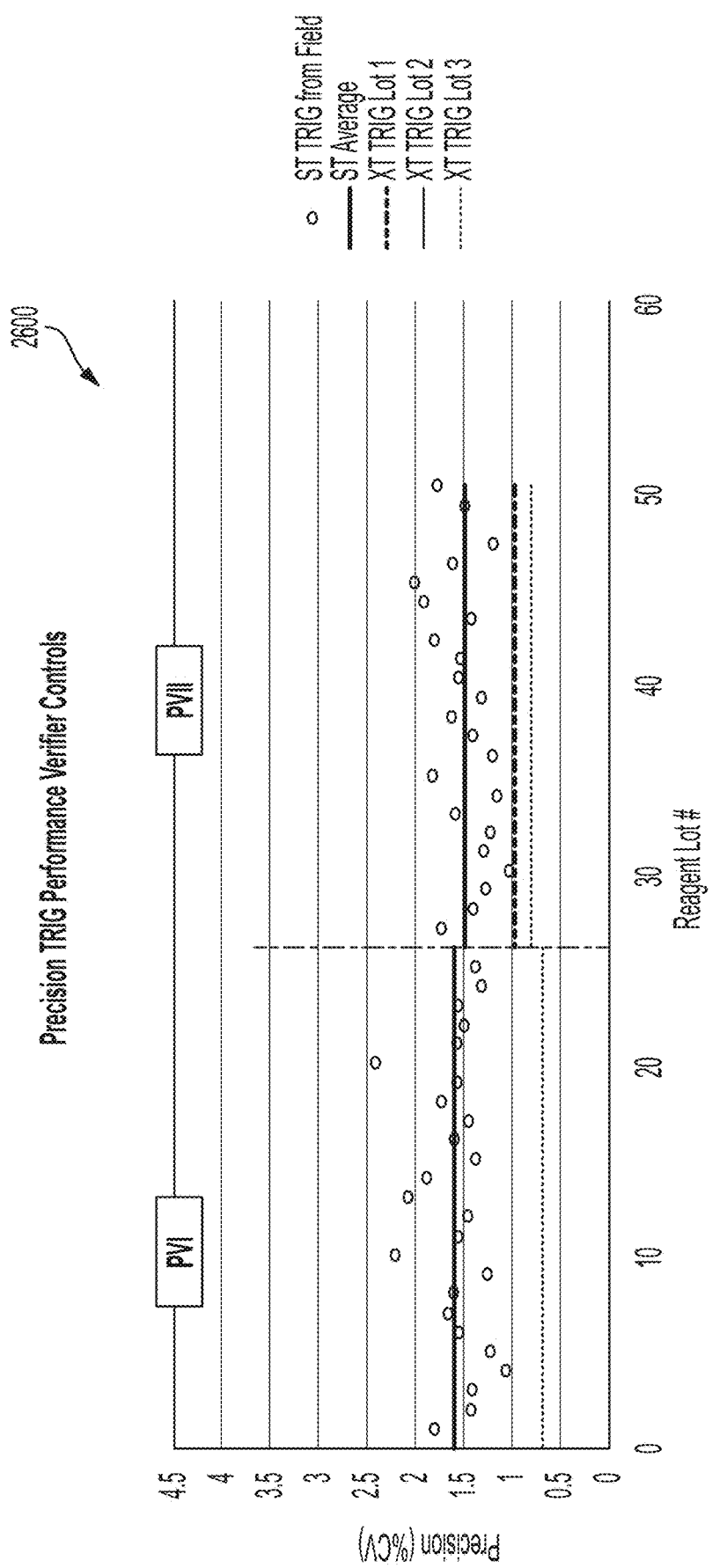
Figure 27:
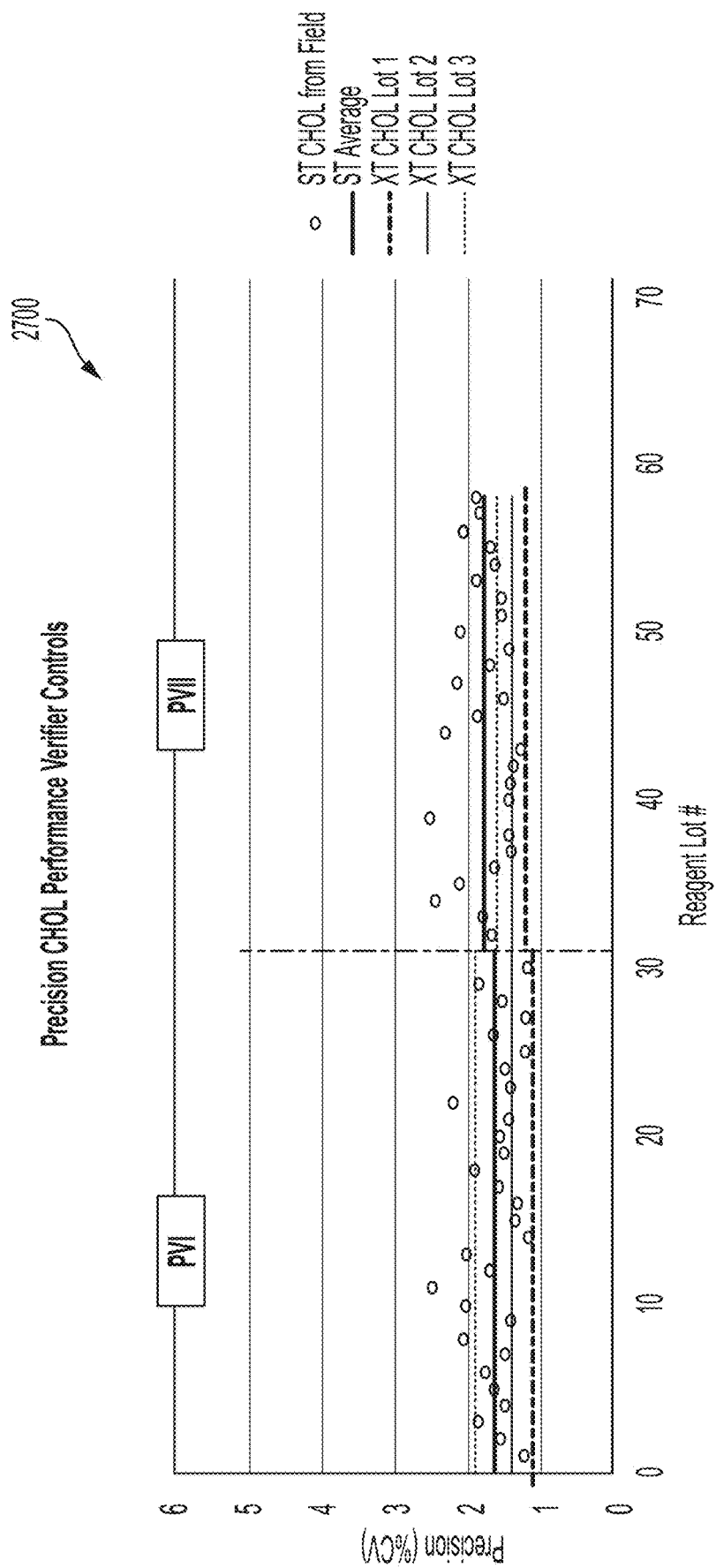
Figure 28:
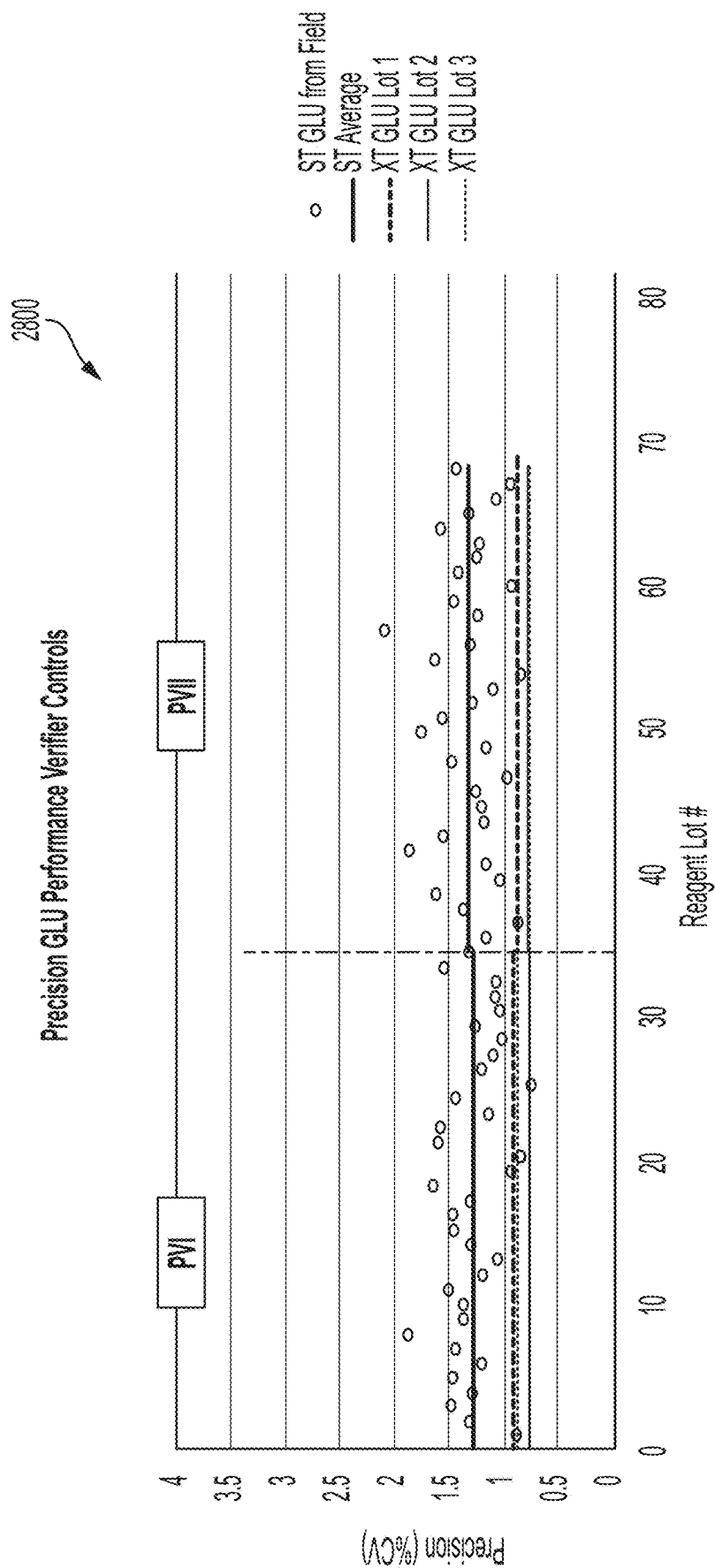
Figure 29:
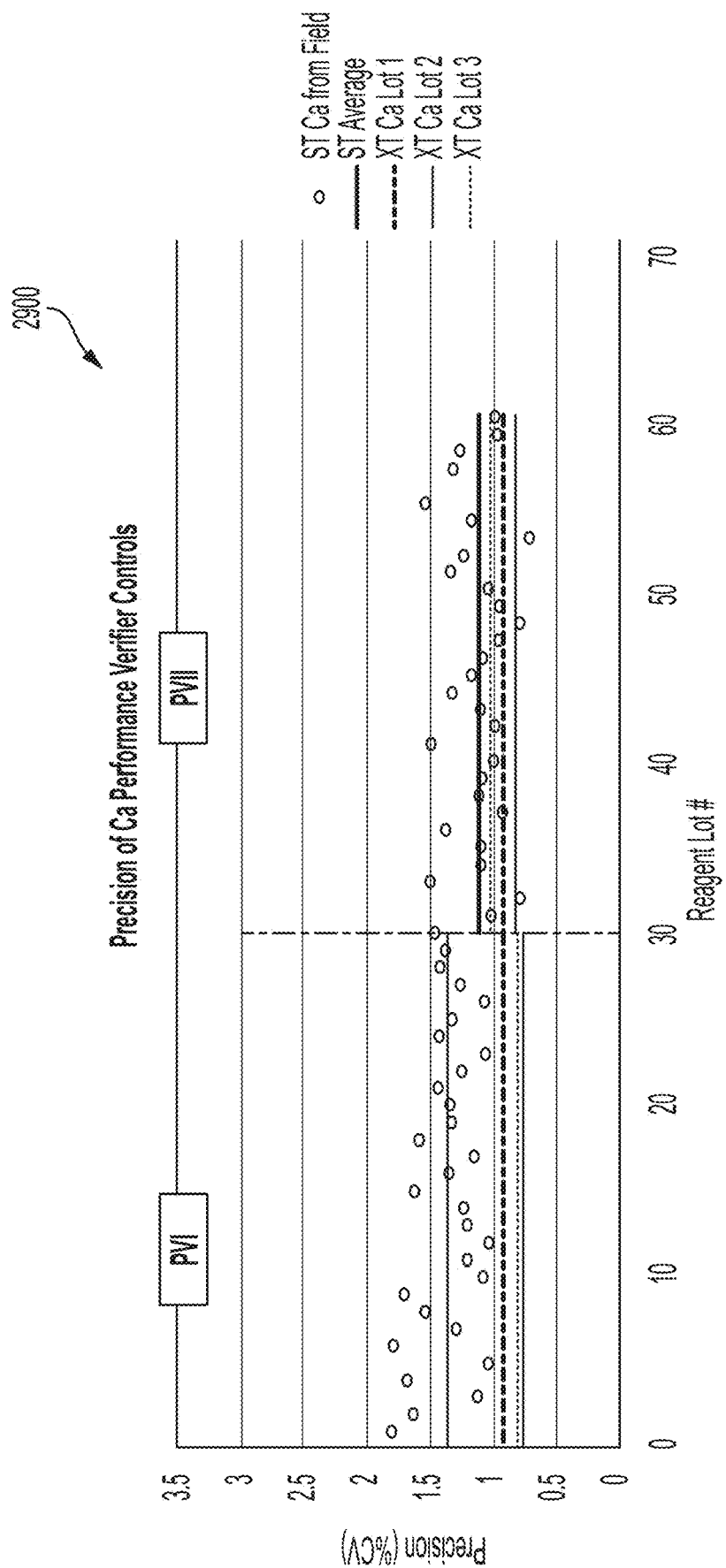

Graph 2600 of FIG. 26 shows that the example solid media 10 analyzed by the assay system 20 had a lower % CV for the TRIG slide chemistry reagent compared to prior art slides analyzed by conventional assay systems. Graph 2700 of FIG. 27 shows that the example solid media 10 analyzed by the assay system 20 had a lower % CV for the CHOL slide chemistry reagent, except Lot 3 for the PVI serum, which had a slightly higher % CV compared to known prior art slides analyzed by conventional systems. Graph 2800 of FIG. 28 shows that the example solid media 10 analyzed by the assay system 20 had a lower % CV for the GLU slide chemistry reagent compared to prior art slides analyzed by conventional assay systems. Graph 2900 of FIG. 29 shows that the example solid media 10 analyzed by the assay system 20 had a lower % CV for the CA slide chemistry reagent compared to prior art slides analyzed by conventional assay systems.

Figure 30:
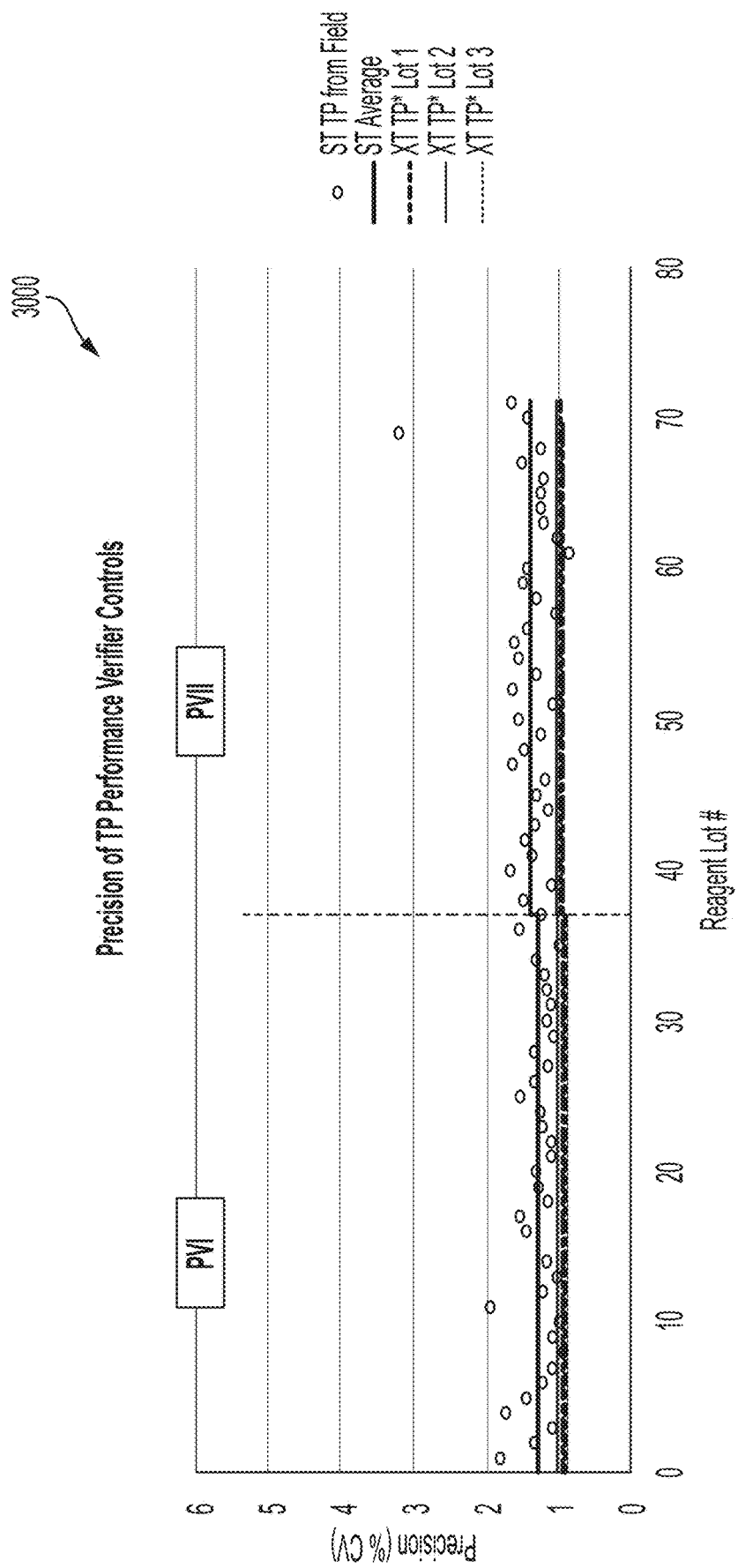
Figure 31:
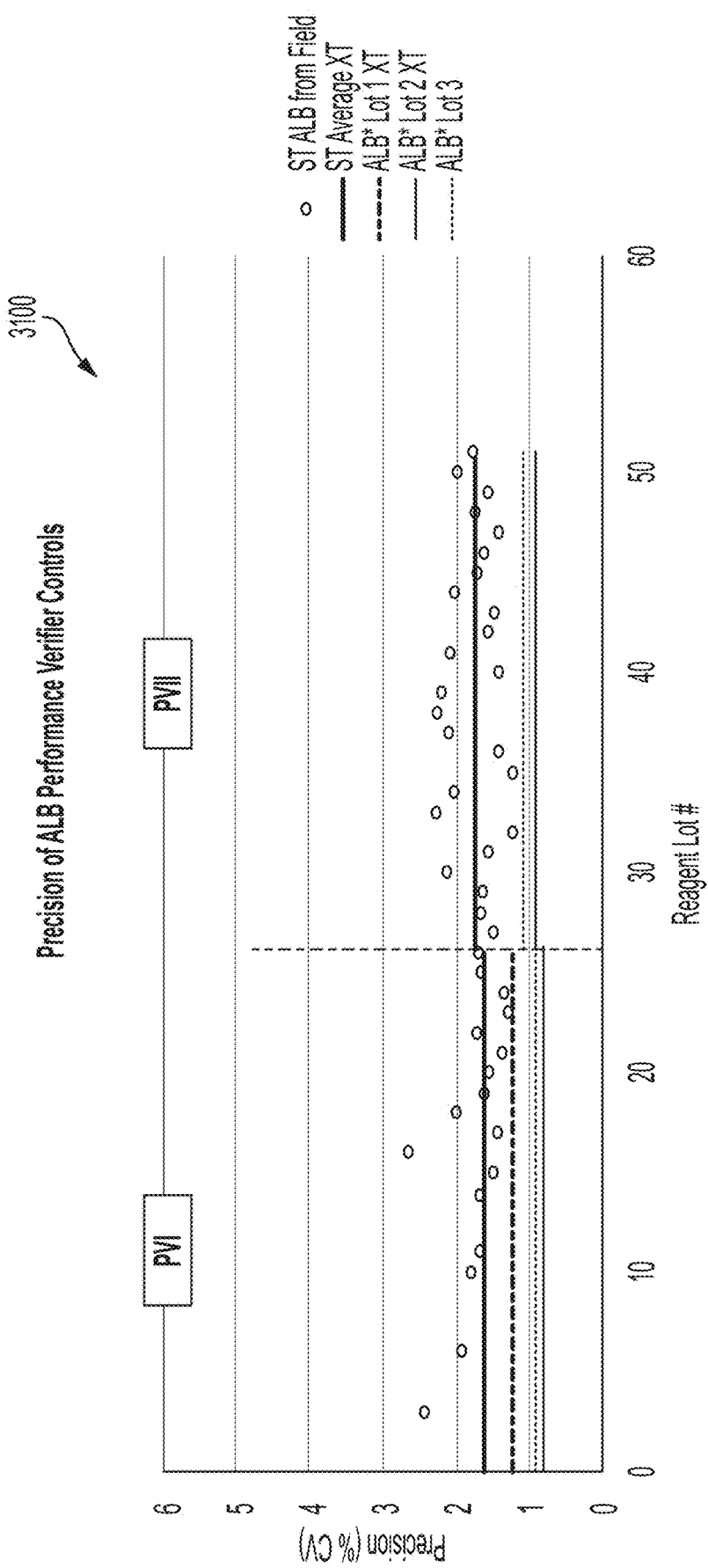
Figure 32:
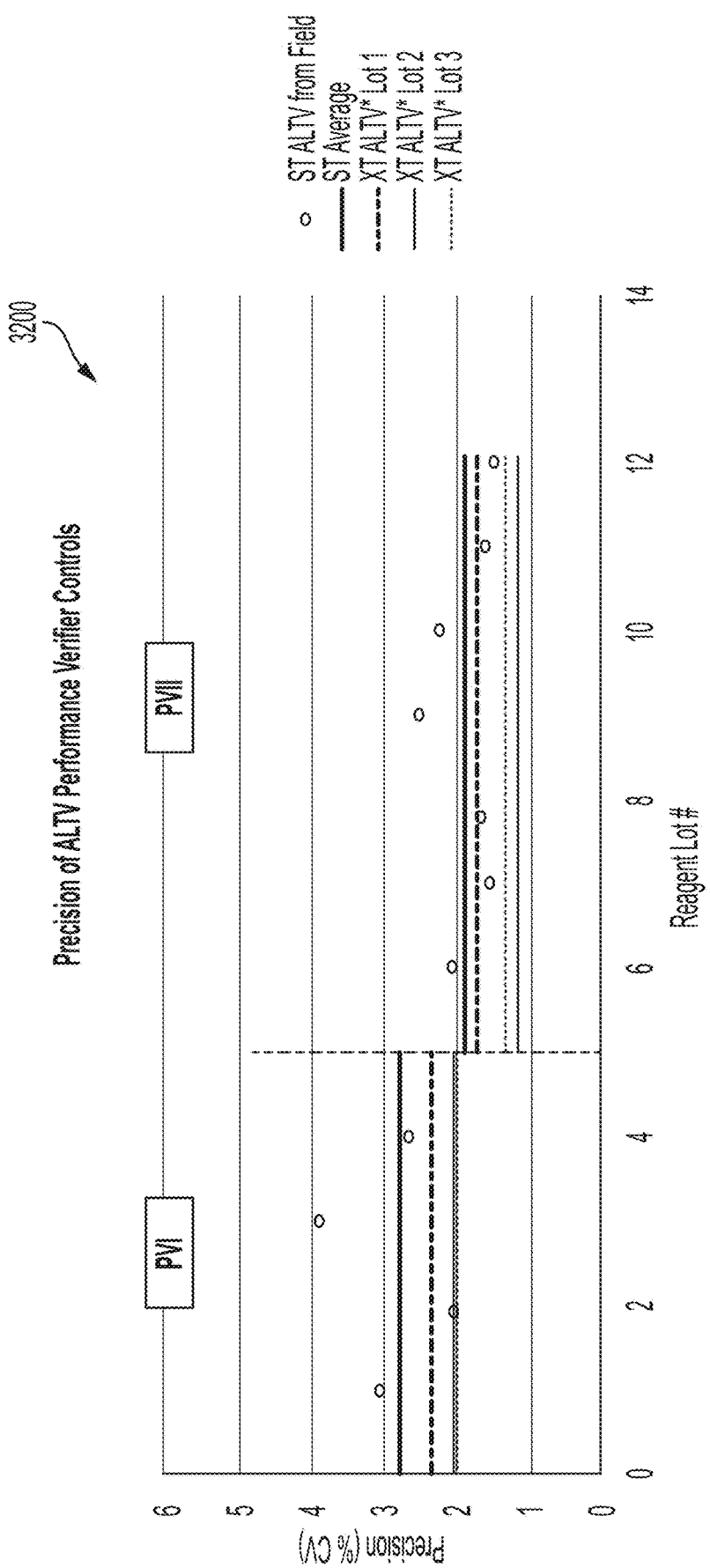
Figure 33:
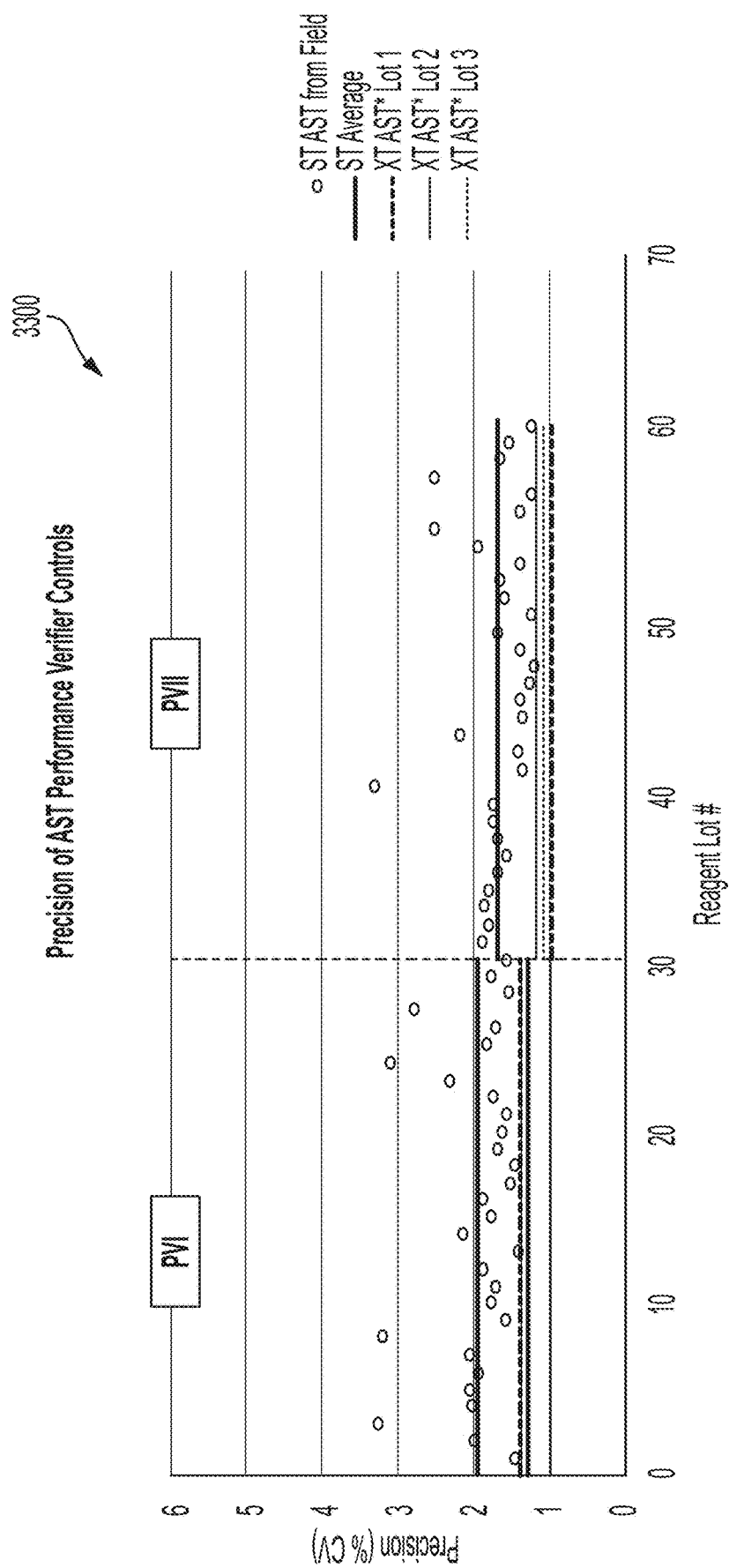

Further, graph 3000 of FIG. 30 shows that the example solid media 10 analyzed by the assay system 20 had a lower % CV for the TP slide chemistry reagent compared to prior art slides analyzed by conventional assay systems. Graph 3100 of FIG. 31 shows that the example solid media 10 analyzed by the assay system 20 had a lower % CV for the ALB slide chemistry reagent compared to prior art slides analyzed by conventional assay systems. Graph 3200 of FIG. 32 shows that the example solid media 10 analyzed by the assay system 20 had a lower % CV for the ALTV slide chemistry reagent compared to prior art slides analyzed by conventional assay systems. Graph 3300 of FIG. 33 shows that the example solid media 10 analyzed by the assay system 20 had a lower % CV for the AST slide chemistry reagent compared to prior art slides analyzed by conventional assay systems.

Figure 34:
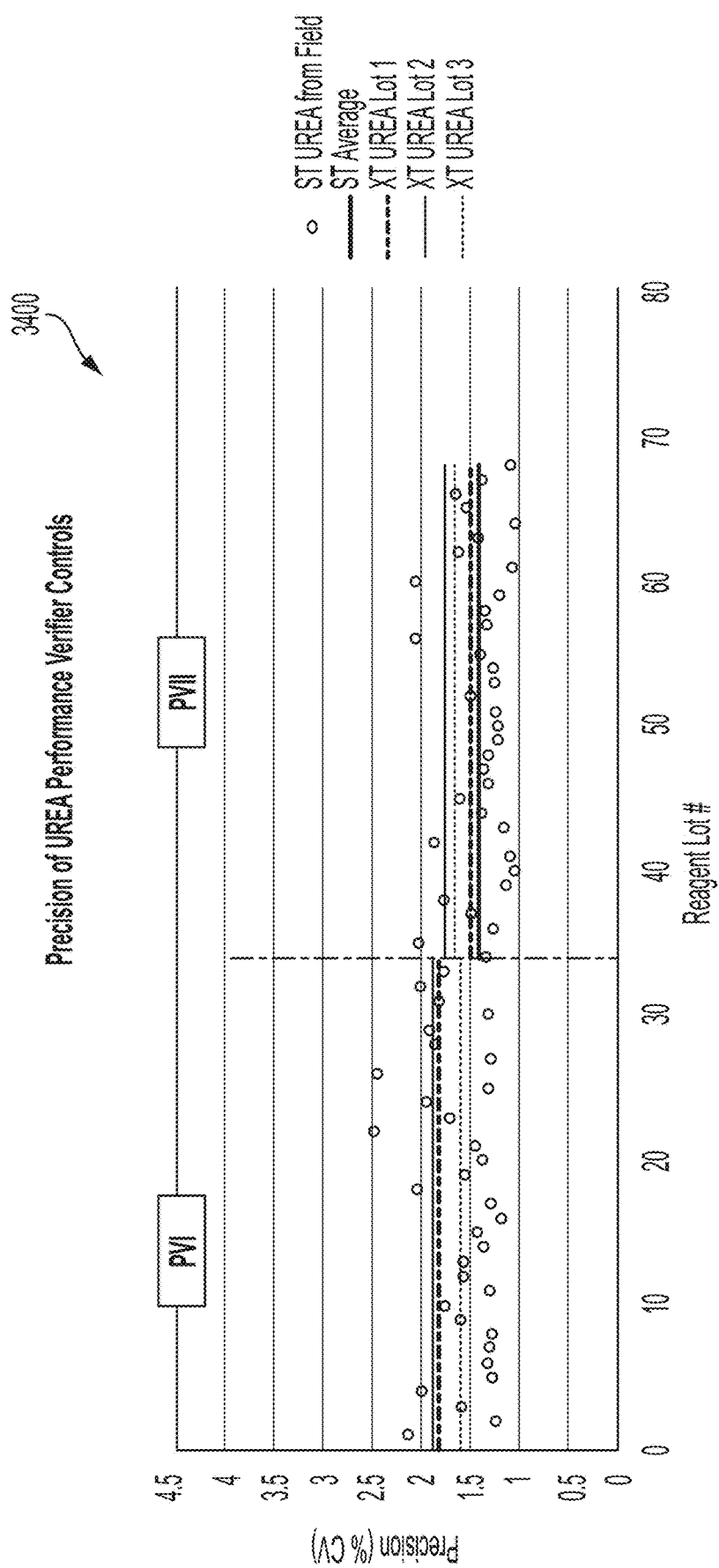
Figure 35:
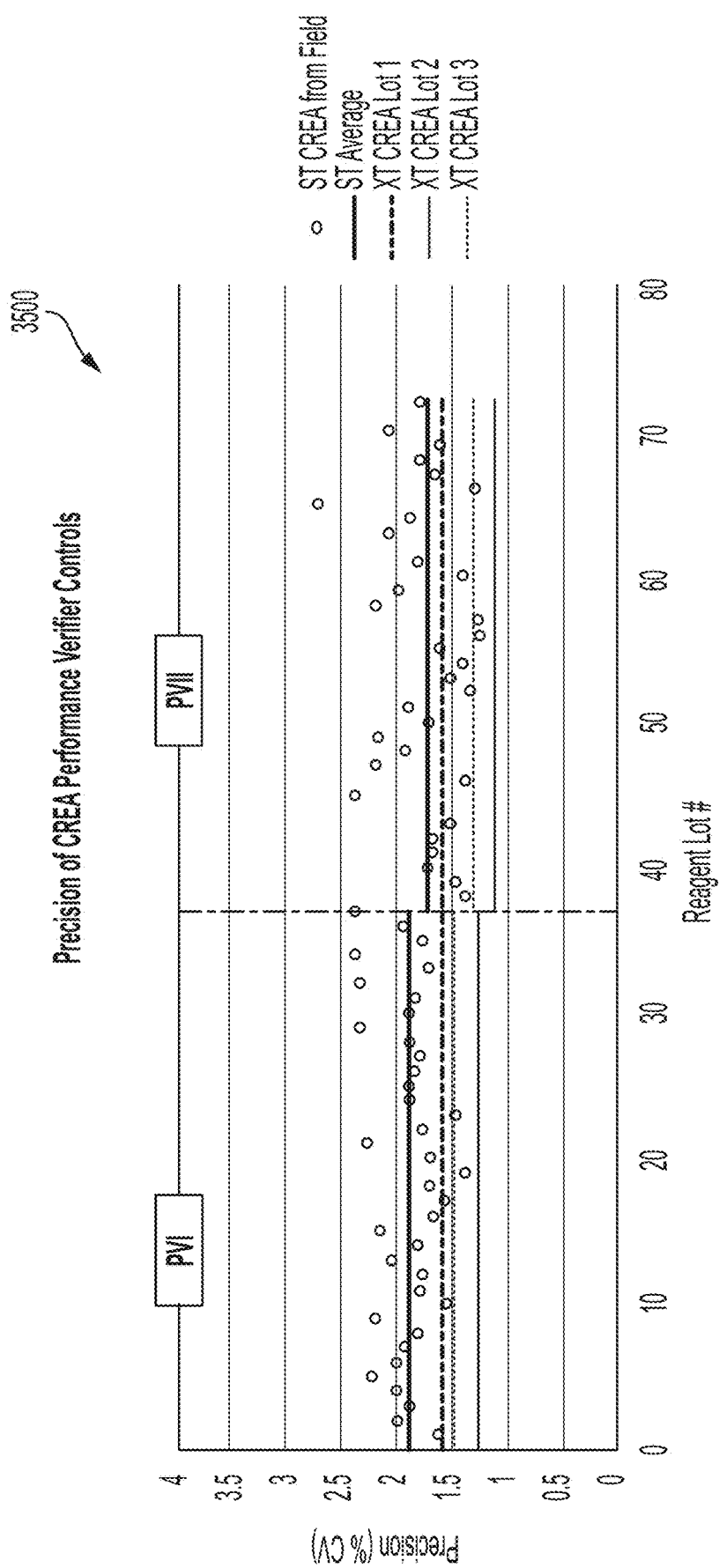
Figure 36:
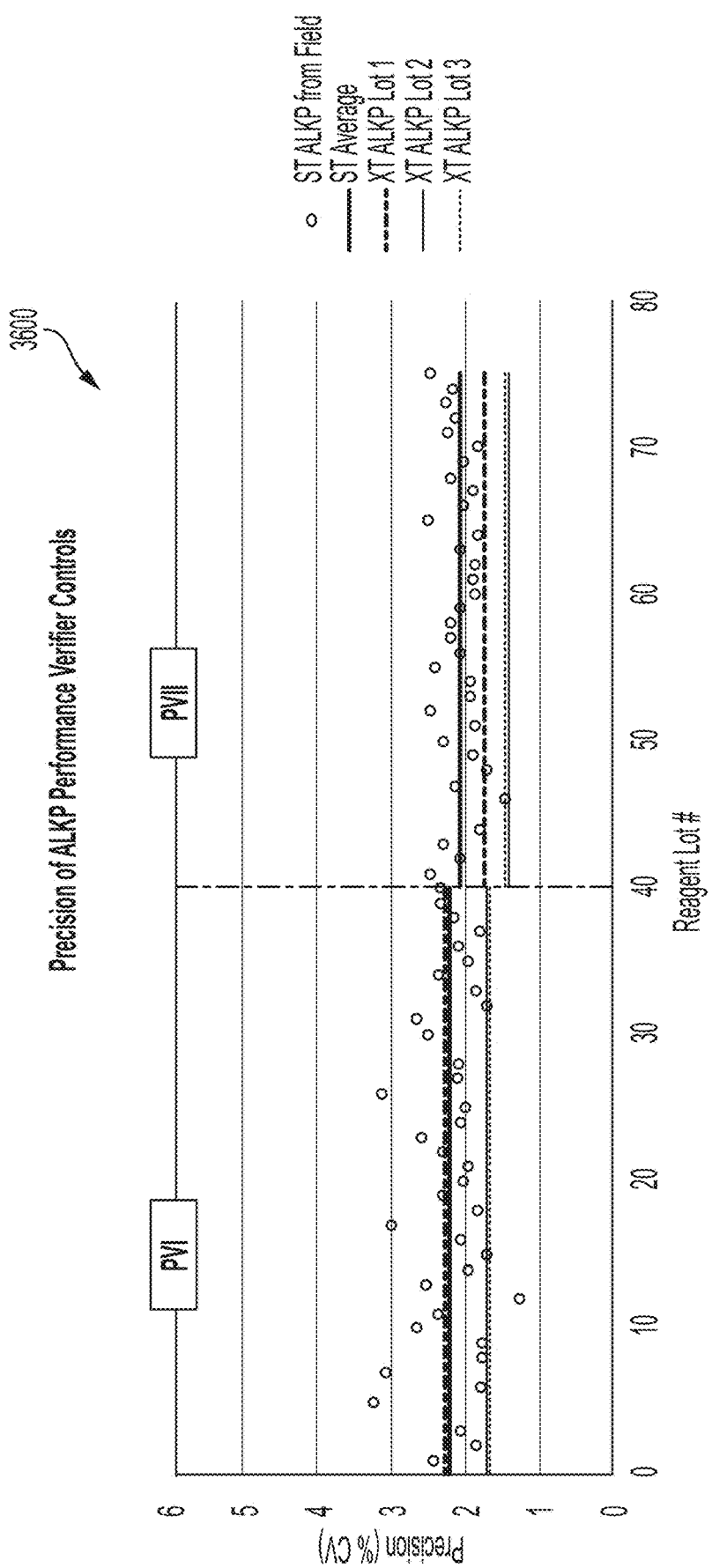
Figure 37:
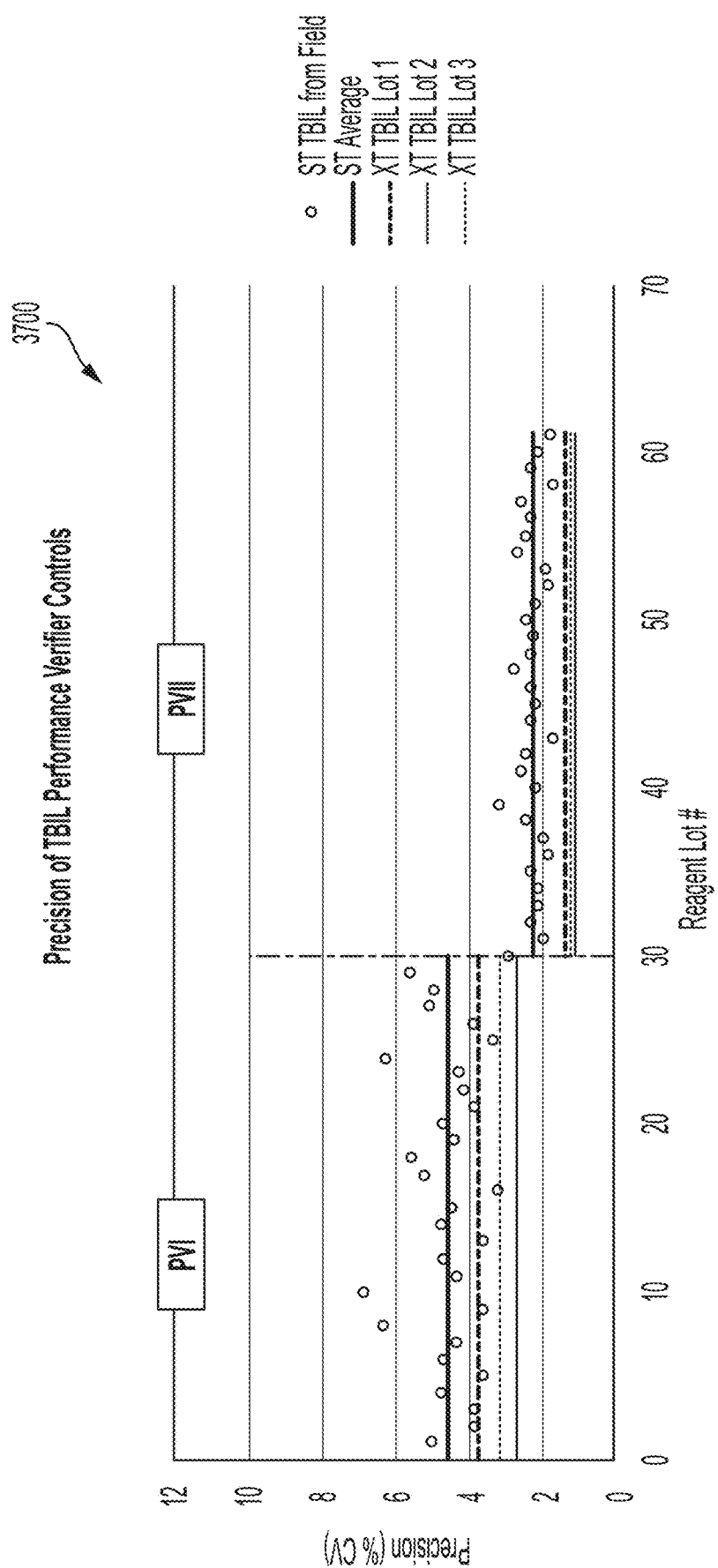

Graph 3400 of FIG. 34 shows that the example solid media 10 analyzed by the assay system 20 had a higher % CV for the UREA slide chemistry reagent compared to prior art slides analyzed by conventional assay systems. However, the difference in % CV between the example system and convention systems is less than 0.5%. Graph 3500 of FIG. 35 shows that the example solid media 10 analyzed by the assay system 20 had a lower % CV for the CREA slide chemistry reagent compared to prior art slides analyzed by conventional assay systems. Graph 3600 of FIG. 36 shows that the example solid media 10 analyzed by the assay system 20 had an approximately equal or lower % CV for the ALKP slide chemistry reagent compared to prior art slides analyzed by conventional assay systems. Graph 3700 of FIG. 37 shows that the example solid media 10 analyzed by the assay system 20 had a lower % CV for the TBIL slide chemistry reagent compared to prior art slides analyzed by conventional assay systems.

CONCLUSION

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

The terms "a" and "an" and "the" and similar referents used in the context of the disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein is intended merely to better illuminate the disclosure and does not pose a limitation on the scope of the disclosure otherwise claimed. No language in the specification should be construed as indicating any non-claimed element essential to the practice of the disclosure.

The use of the term "or" in the claims is used to mean "and/or" unless explicitly indicated to refer to alternatives only or the alternatives are mutually exclusive, although the disclosure supports a definition that refers to only alternatives and "and/or."

Groupings of alternative elements or embodiments of the disclosure disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

Preferred embodiments of the disclosure are described herein, including the best mode known to the inventors for carrying out the disclosure. Of course, variations on those preferred embodiments will become apparent to those of ordinary skill in the art upon reading the foregoing description. The inventor expects those of ordinary skill in the art to employ such variations as appropriate, and the inventors intend for the disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the disclosure so claimed are inherently or expressly described and enabled herein.

Further, it is to be understood that the embodiments of the disclosure disclosed herein are illustrative of the principles of the present disclosure. Other modifications that may be employed are within the scope of the disclosure. Thus, by way of example, but not of limitation, alternative configurations of the present disclosure may be utilized in accordance with the teachings herein. Accordingly, the present disclosure is not limited to that precisely as shown and described.

The invention is claimed as follows:

1. A method of performing at least one assay comprising:
   obtaining, in a control unit, an image of a fluid sample that is located on a reaction cell;
   determining, via the control unit, a default center corresponding to at least one of a center of the reaction cell or a center of a dispense location of the fluid sample onto the reaction cell;
   creating, via the control unit, a set of derivative data including a plurality of derivative data points based on the image;
   determining, via the control unit, an image gradient data point for each of the plurality of derivative data points to create a binary image by:
      comparing each of the plurality of derivative data points to a threshold value,
      assigning a value of '0' to the image gradient data points that correspond to the derivative data points that have a value that is greater than the threshold value to remove unwanted image artifacts, and
      assigning a value of '1' to the remaining image gradient data points;
   determining, via the control unit, a center of mass of the binary image using the image gradient data points;
   designating, via the control unit, the determined center of mass as a target location of the fluid sample on the reaction cell;
   comparing, via the control unit, the target location to the default center; and
   performing, via the control unit and a related assay system, the at least one assay using the target location of the fluid sample on the reaction cell when a distance between the default center and the target location is less than a threshold.

2. The method of claim 1, wherein the reaction cell includes a solid media, a dry slide, or a reaction cuvette.

3. The method of claim 1, wherein the target location includes a center of a homogeneous region of the fluid sample on the reaction cell.

4. The method of claim 1, which includes performing multiple assays using target locations from a plurality of images.

5. The method of claim 1, wherein the plurality of derivative data points are first order derivatives that are based on colors in the image.

6. The method of claim 1, wherein determining the target location of the fluid sample includes at least one of:

(i) using first image gradient data points having a lower image gradient than second image gradient data points; or
   (ii) excluding the second image gradient data points having a higher image gradient than the first image gradient data points.

7. The method of claim 1, which includes removing, via the control unit, image defects from the image.

8. The method of claim 1, wherein the image is a two-dimensional image.

9. The method of claim 1, which includes forming, via the control unit, a read area around the target location, and wherein performing the at least one assay includes using the read area.

10. The method of claim 1, wherein determining the target location of the fluid sample includes detecting or measuring an indicator reaction of indicator molecules on the reaction cell formed from at least one reagent combining with the fluid sample.

11. The method of claim 1, further comprising reporting, via the control unit, an error indicative that a new fluid sample should be dispensed on a new reaction cell when the distance between the default center and the target location is greater than or equal to the threshold.

12. A method of performing at least one assay comprising:
   obtaining, via a control unit, an image of a fluid sample located on a reaction cell;
   determining, via the control unit, a default center corresponding to at least one of a center of the reaction cell or a center of a dispense location of the fluid sample onto the reaction cell;
   creating, via the control unit, a set of derivative data including a plurality of derivative data points based on the image;
   determining, via the control unit, an image gradient data point for each of the plurality of derivative data points to create a binary image by:
      comparing each of the plurality of derivative data points to a threshold value,
      assigning a value of '0' to the image gradient data points that correspond to the derivative data points that have a value that is greater than the threshold value to remove unwanted image artifacts, and
      assigning a value of '1' to the remaining image gradient data points;
   determining, via the control unit, a center of mass of the binary image using the image gradient data points;
   designating, via the control unit, the determined center of mass as a target location of the fluid sample;
   forming, via the control unit, a read area around the target location;
   comparing, via the control unit, the target location to the default center; and
   performing, via the control unit and a related assay system, the at least one assay using the read area when a distance between the default center and the target location is less than a threshold.

13. The method of claim 12, wherein the reaction cell includes a solid media, a dry slide, or a reaction cuvette.

14. The method of claim 12, wherein the read area appears circular in the image.

15. The method of claim 12, wherein the read area appears elliptical in the image.

16. The method of claim 12, which includes setting, via the control unit, each image gradient data point to a value of '1' if the image gradient data point has a value that is less than the threshold value.

17. The method of claim 12, which includes performing, via the control unit and the related assay system, multiple assays using target locations from a plurality of images.

18. The method of claim 12, wherein the image is a two-dimensional image.

19. An apparatus for performing at least one assay comprising:
a slide reception location configured to receive at least one reaction cell having a fluid sample located thereon;
an imaging device positioned and arranged relative to the slide reception location to obtain an image of the fluid sample located on the reaction cell; and
a control unit configured to:
determine a default center corresponding to at least one of a center of the reaction cell or a center of a dispense location of the fluid sample onto the reaction cell,
create a set of derivative data including a plurality of derivative data points based on the image,
determine an image gradient data point for each of the plurality of derivative data points to create a binary image by:
comparing each of the plurality of derivative data points to a threshold value,
assigning a value of '0' to the image gradient data points that correspond to the derivative data points that have a value that is greater than the threshold value to remove unwanted image artifacts, and
assigning a value of '1' to the remaining image gradient data points,
determine a center of mass of the binary image using the image gradient data points,
designate the determined center of mass as a target location within the fluid sample located on the reaction cell, compare the target location to the default center, and
perform the at least one assay based on the target location when a distance between the default center and the target location is less than a threshold.

20. The apparatus of claim 19, wherein the reaction cell includes a solid media, a dry slide, or a reaction cuvette.

21. The apparatus of claim 20, wherein the solid media includes a second reaction cell.

22. The apparatus of claim 19, wherein the target location includes a central location of a homogeneous region of the fluid sample.

23. The apparatus of claim 19, wherein the control unit is configured to set each image gradient data point to a value of '1' if the respective image gradient data point has a value that is less than the threshold value.

24. The apparatus of claim 19, wherein the control unit is configured to determine the target location by at least one of: (i) using first image gradient data points having a lower image gradient than second image gradient data points; or (ii) excluding the second image gradient data points having a higher image gradient than the first image gradient data points.

25. The apparatus of claim 19, wherein the control unit is configured to determine the target location at a geometrical center of first image gradient data points that have a lower image gradient than second image gradient data points.

26. The apparatus of claim 19, wherein the control unit is configured to perform multiple different assays using target locations from a plurality of images.

27. The apparatus of claim 19, wherein the target location of the fluid sample on the reaction cell corresponds to a location where an indicator reaction occurs such that an indicator is developed for display as target molecules in the fluid sample react with reagents on the reaction cell.

* * * * *